(12) United States Patent
Mansingh et al.

(10) Patent No.: US 7,085,660 B2
(45) Date of Patent: *Aug. 1, 2006

(54) ENERGY MANAGEMENT SYSTEM IN A POWER AND DISTRIBUTION SYSTEM

(75) Inventors: Ashmin Mansingh, Brooklyn Park, MN (US); Haso Peljto, Brooklyn Park, MN (US); Mike York, Brooklyn Park, MN (US); Dingguo Chen, Eden Prairie, MN (US)

(73) Assignee: Siemens Power Transmission & Distribution, Inc., Wendell, NC (US)

( * ) Notice: Subject to any disclaimer, the term of this patent is extended or adjusted under 35 U.S.C. 154(b) by 47 days.

This patent is subject to a terminal disclaimer.

(21) Appl. No.: 10/844,097

(22) Filed: May 12, 2004

(65) Prior Publication Data

US 2004/0260489 A1    Dec. 23, 2004

Related U.S. Application Data

(60) Provisional application No. 60/470,039, filed on May 13, 2003, provisional application No. 60/470,038, filed on May 13, 2003, provisional application No. 60/470,096, filed on May 13, 2003, provisional application No. 60/470,095, filed on May 13, 2003.

(51) Int. Cl.
*G01R 21/00* (2006.01)

(52) U.S. Cl. ............................ 702/60; 702/57; 702/58; 702/59; 702/85; 700/291; 700/292; 700/297

(58) Field of Classification Search ................. 702/60, 702/58, 59; 700/286, 291, 292, 297
See application file for complete search history.

(56) References Cited

U.S. PATENT DOCUMENTS

| | | | | |
|---|---|---|---|---|
| 5,216,623 A | * | 6/1993 | Barrett et al. | 702/62 |
| 6,061,609 A | * | 5/2000 | Kanoi et al. | 700/291 |
| 6,577,962 B1 | * | 6/2003 | Afshari | 702/61 |
| 6,785,592 B1 | * | 8/2004 | Smith et al. | 700/291 |

* cited by examiner

*Primary Examiner*—Marc S. Hoff
*Assistant Examiner*—Phuong Huynh
(74) *Attorney, Agent, or Firm*—José R. de la Rosa

(57) ABSTRACT

A method and system is provided for optimizing the performance of a power generation and distribution system that monitors the performance of a power system, detects disturbances and calculates statistical information, uses historical performance data and economic factors to analyze and control the production of power. Load demands are predicted by utilizing very short term load forecasts that are based on historical load data, demand patterns and short term load forecasts. Generating units are each assigned a temporal trajectory of output power over consecutive time intervals. The allocation of available resources is assigned so as to minimize costs associated with meeting changing loads.

21 Claims, 10 Drawing Sheets

ICC FOR UNIT AT TIME t      ICC FOR UNIT AT TIME t+1

ENERGY MANAGEMENT SYSTEM IN A POWER AND DISTRIBUTION SYSTEM

CROSS-REFERENCE TO RELATED APPLICATIONS

This application claims priority to, and incorporates by reference in their entirety, the following pending provisional applications:
Ser. No. 60/470,039, filed 13 May 2003;
Ser. No. 60/470,038, filed 13 May 2003;
Ser. No. 60/470,096, filed 13 May 2003; and
Ser. No. 60/470,095, filed 13 May 2003.

FIELD OF THE INVENTION

The present invention relates to method and system for controlling and optimizing the performance of a power generation and distribution system. More specifically, a method and system is disclosed for monitoring the performance of a power system, for detecting disturbances and calculating statistical information, for utilizing historical performance data and economic factors to analyze and control the production of power.

BACKGROUND OF THE INVENTION

Restructuring in the power industry has been the result of an operational change from a regulated monopoly to a free market system in which transmission operators are required to operate in a fair manner with all market participants. However, these same operators are also tasked with profit objectives of running a business in the power market. Often the manner in which market participants are required to operate is in direct conflict with technical and economic constraints. These constraints are imposed by regulatory agencies, economic concerns, and equipment performance limitations.

At the moment, operators provide regulatory agencies with schedule information detailing the quantity of energy and the time that energy will be produced. These schedules of energy vary over the course of a year, month, week, day, hour and other intervals of time such as seasons and special days such as holidays and weekends. Despite knowing that such energy requirements vary considerably at times, operators are often tasked with the burden of meeting demand for real-time and unanticipated shortage in energy. Meeting these unanticipated demands is often the cause of increased energy costs. Alternatively, decreases in energy costs may be the result of having to provide less energy when a glut of unanticipated energy exists in the marketplace.

As readily apparent, there is a significant need for a method and system which optimizes performance by minimizing costs and which complies with regulatory, economic and technical constraints. The present invention is a solution to the needs of energy producers which must control their production capacity to meet regulatory requirements and to minimize costs and optimize profitability.

SUMMARY OF THE INVENTION

The present invention is intended to provide a method and system by which energy producers are able to optimize power generation. This objective is achieved by employing a method and system which monitors the performance of a power system, detects disturbances and calculates statistical information, uses historical performance data and economic factors to analyze and control the production of power. To minimize costs, neural networks are used to make short term load predictions through the use of historical load data and short term load forecast data. Allocation of generating resources are made by monitoring the performance of a power system, determining the ramping constraints of each of a plurality of committed generating units; receiving very short term load predictions from a Very Short Term Load Predictor for a set of predetermined and consecutive time intervals, obtaining a temporal trajectory of output power for each of the plurality of generating units over the set of predetermined and consecutive time intervals, such that costs associated with changing power output within the electrical power system is minimized; and assigning a respective temporal trajectory of output power to each of the plurality of generating units.

BRIEF DESCRIPTION OF THE DRAWINGS

A wide variety of potential embodiments will be more readily understood through the following detailed description, with reference to the accompanying drawings in which.

DETAILED DESCRIPTION OF THE INVENTION

System operators have found it a challenge to readily match changes in load requirements with power generation for their control areas. Nevertheless automatic generation control systems have attempted to control this mismatch between sources of power and uses of power, by balancing real-power and by stabilizing frequency. As a guide to power and load management, NERC has provided control performance standards aimed at minimizing any adverse effects on neighboring control areas. To be in compliance with these NERC requirements, a system operator must balance its generation and interchange schedules with its load.

As a measure of conformity to the control performance standards, a first compliance factor know as ACE (Area Control Error) is applied to the power system's operations. For purposes of illustration, the ACE equation is shown below in a slightly simplified form:

$$ACE = (I_A - I_S) - 10\beta(F_A - F_S) \quad (1)$$

where I refers to the algebraic sum of all power (MW) flows on tie-lines between a control area and its surrounding control areas, F is the interconnection frequency (Hz), A is actual, S is scheduled, and β is the control area's frequency bias (MW/0.1 Hz). Frequency bias is the amount of generation needed to respond to a 0.1 Hz change in interconnection frequency. It is normally set to the supply-plus-load response of a control area to a change in interconnection frequency. The first terms shows how well the control area performs in matching its schedules with other control areas. The second term is the individual control area's contribution to the interconnection to maintain frequency at its scheduled value. Accordingly, $ACE_i$ is the instantaneous difference between actual and scheduled interchange, taking into account the effects of frequency. It measures how well a control area manages its generation to match time-varying loads and scheduled interchange.

However, as a guide to performance, NERC (North American Reliability Council) has defined minimum Control Performance standards (CPS1, CPS2 & DCS). CPS1 is shown below:

$$CPS1 = AVG_{12-month}\left[\left(\frac{ACE_i}{-10B_i}\right)_i \Delta F_i\right] \leq \varepsilon_1^2 \quad (2)$$

where $ACE_i$ is the clock-minute average of ACE (tie-line bias ACE), $B_i$ is the frequency bias of the control area, $\Delta F_i$ the clock-minute average frequency error, and $\varepsilon_1^2$ is the interconnections' targeted frequency bound. In short, CPS1 measures the relationship between ACE and interconnection frequency on a 1-minute average basis. The equation can be written as follows:

$$1 \geq AVG_{12-month}\left[\left(\frac{ACE}{-10B_i}\right)_i \Delta F_i\right] / \varepsilon_1^2 \quad (3)$$

If the above equation is evaluated for the various instantaneous inputs into ACEi, the resultant should be greater than or equal to 1.

Figure 1:
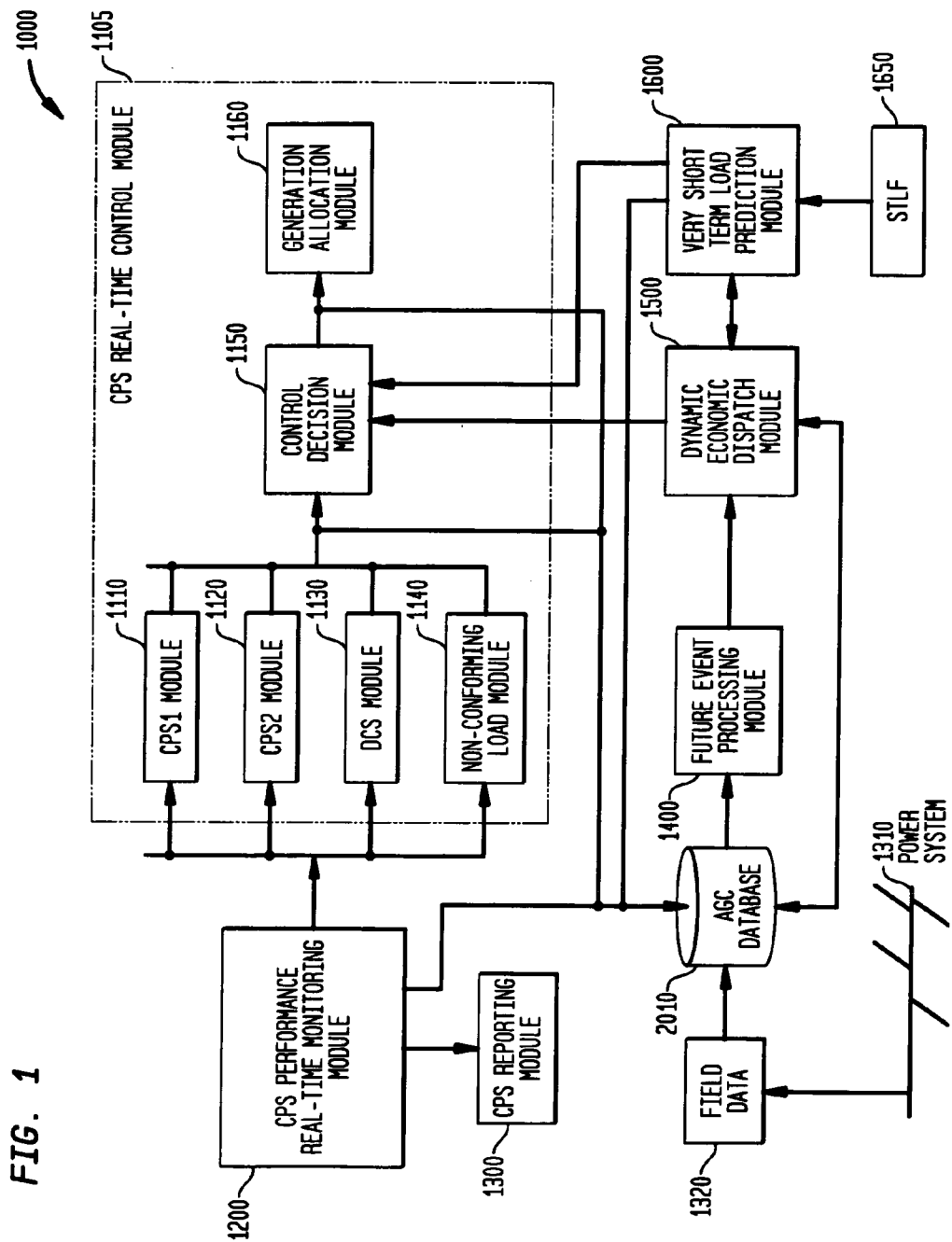
FIG. 1 is an illustration of an energy management system.

The present invention, provides for a method and system by which automatic generation control of a power system is governed by compliance to NERC CPS1, CPS2 and DCS standards or any other standard/specification on a real-time basis through control of interchange and frequency errors. Shown in FIG. 1 is a block diagram of an exemplary energy management system 1000 that incorporates the present invention. The energy management system 1000 provides for NERC compliance while minimizing costs associated with load and power management. An automatic generation control database 2010 (FIG. 2) stores all related monitoring and control data and applications related to the power system under operator management. From external monitoring and control devices such as sensors, and actuators and through a monitoring and control network such as a SCADA network, monitoring data is feed to the CPS monitoring module 1200. CPS monitoring Module 1200 (FIG. 2) comprises CPS1 monitoring module 2020 and CPS2 monitoring module 2030 as well as a DCS reporting module 2040. The received data form AGC database 2010 and HFD (Historic & Future data) database 2050 is used to calculate statistical information which will be used to control the system and render the system under NERC CPS1, CPS2 and DCS compliance. In particular, the received data and resultant statistics and/or historical performance data is used for analysis, decision and control management of the power system. Moreover, the data is further archived in the AGC database 2010 for use in future analysis. It should be understood that a reference to a module includes but is not limited to a set of instructions executable by a processor and may take the form of software, firmware or hardware or any combination thereof. Moreover, a processor should be understood to mean one or more computing devices or hardware devices that execute the commands in the set of instructions.

Figure 2:
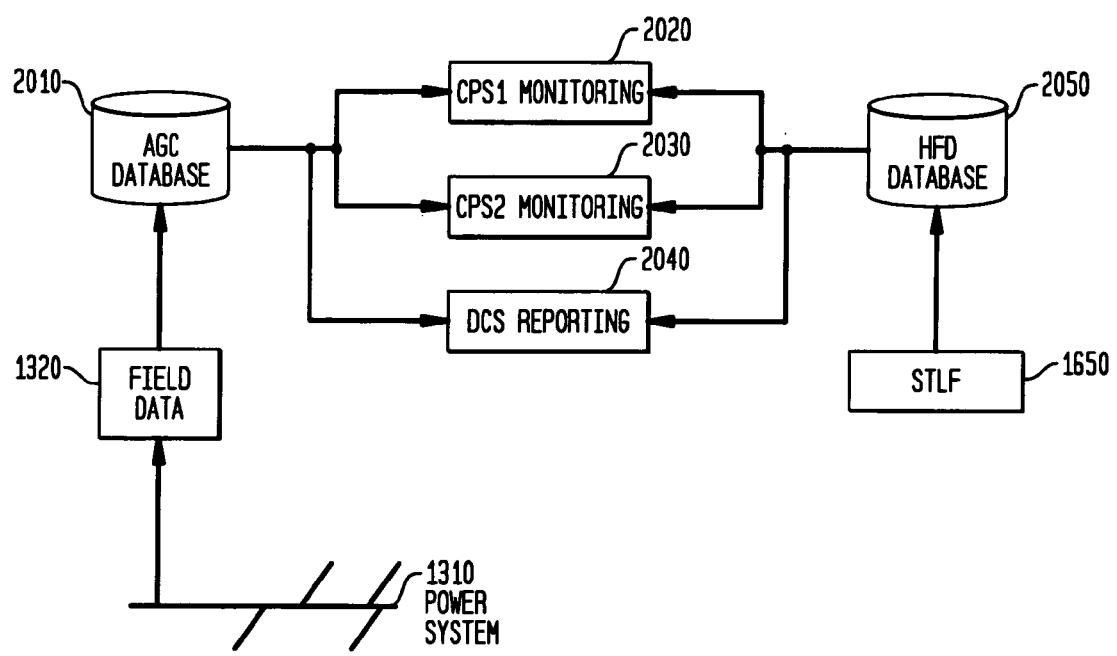
FIG. 2 is an illustration of data flow among the CPS1, CPS2, DCS reporting modules and the AGC and HFD databases.

As shown in FIG. 2., the monitoring/reporting modules CPS1 monitoring 2020, CPS2 monitoring 2030, DCS reporting 2040 modules use real-time data from the field (field data 1320) as well as historical and future (expected/predicted) performance data to generate real-time performance statistical displays and calculated statistical displays based on past and/or predicted performance data. Moreover, the CPS monitoring module 1200 takes the net power flow and net interconnection frequency as well frequency bias βi to calculate an instantaneous ACEi value. As noted above, ACEi is the instantaneous difference between actual and scheduled interchange, taking into account the effects of frequency bias.

Because of the operational nature of the power system to be monitored and controlled, real-time monitoring and responses to these illustrated systems must be understood to be a real-time period of time less than or equal to one (1) hour. However from the field is preferably captured and processed in intervals of less than or equal to four (4) seconds. Each of the sampled data within the four (4) second interval is used to generate statistical and historical data for display, storage and future use. The CPS monitoring module 1200 will use the input ranges of frequency and interchange error to construct a CPS compliance plot that shows the CPS regions that are or are not in compliance with NERC compliance standards. In addition to the real-time data received from the field to generate real-time statistic, (frequency and interchange error), calculated statistics are generated by using raw and/or statistical data from previous predetermined intervals. For example, last day, 30 days and one (1) year data may also be used to display statistical performance. Moreover, monitoring module 1200 allows for operator selected target compliance, CPS2 Threshold setting (L10). In addition to statistical display statistical data may be communicated in hardcopy and/or electronic format through CPS reporting module 1300. In particular, CPS reporting module 1300 may be used to directly report performance compliance to NERC. An example of a statistical display is shown below in Table 1.

TABLE 1

| CPS1 Performance | | CPS2 Performance | |
|---|---|---|---|
| Last Hour | 140% | Last Hour | 83% |
| Last Day | 158% | Last Day | 97.1% |
| Last Month (30 days) | 142% | Last Month (30 days) | 92% |
| Last Year | 141% | Last Year | 95.4% |
| | | CPS2 Theshold | 50 MW |
| | | L10 | 65 MW |
| Target Compliance | 120% | | |

CPS real-time control module 1105 as shown in FIG. 1, comprises CPS1 module 1110, CPS2, DCS, Non-conforming Load, Control Decision and Generation Allocation modules 1110, 1120, 1130, 1140, 1150, 1160. Real-time statistical data and calculated statistical data as well DCS data are all sent to corresponding processing modules as shown in FIG. 1. CPS1 module 1110 processes real-time ACE data, evaluates the current CPS1 compliance factor and calculates necessary corrective action to bring the power system to meet CPS1 target values. More specifically, CPS1 module 1110 retrieves from the AGC database 2010 and/or HFD database 2050 real-time data, and statistics which are generated by the CPS1 monitoring module 2020 such as instantaneous ACEi values. As noted in equations (2) and (3), the compliance factor is dependent on the instantaneous ACEi values, average frequency error, frequency bias and interconnection's targeted frequency bounds. To comply with NERC CPS1 requirements, a one year average of CPS1 values must be greater than or equal to 100% or a compliance factor of 1.

An evaluation of the current 1-minute ACE average is made, and then at each AGC cycle, an instantaneous NERC CPS1 percentage or compliance factor is calculated. Depending on the resultant values as well as other input data to the Control Decision module 1150, corresponding and regulating controls signals are generated. The calculated CPS1 compliance factor is compared to the CPS1 target value set by the system operator. Whenever the CPS1 falls below 1, a correction signal is generated.

Figure 3:
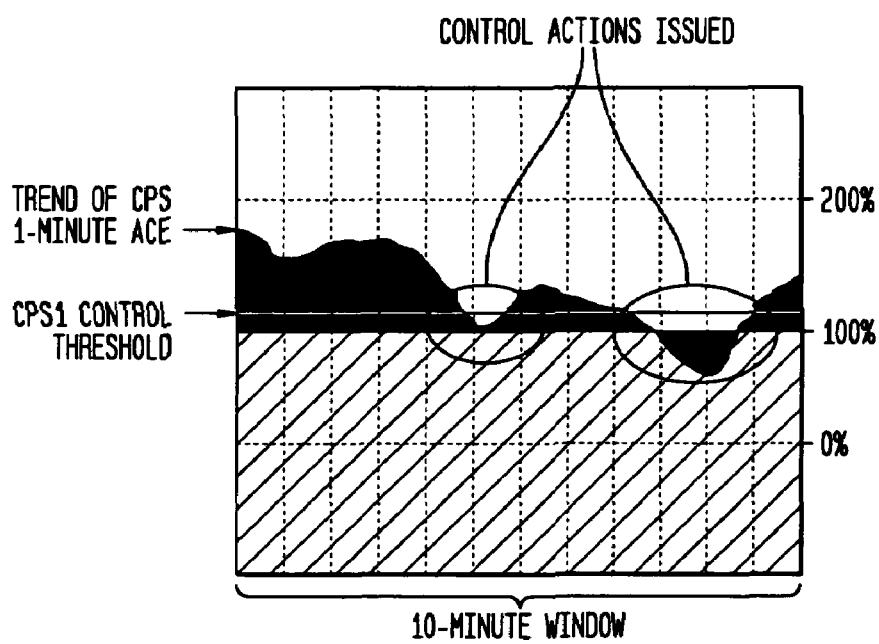
FIG. 3 illustrates a 10 minute window of ACE variances about a CPS1 control threshold.

Although the CPS1 target value is normally set to 1 (100%), the system operator may set the CPS1 target value higher or lower depending on the operators prior 12 month performance. For example, as shown in FIG. 3, a control threshold is set for 100% and whenever, the instantaneously calculated CPS1 percentage falls below the 100% threshold, a correction signal is generated. Alternatively, the trend within that 10-minute window or any other period may be used as a basis for determining what action is necessary.

Figure 4:
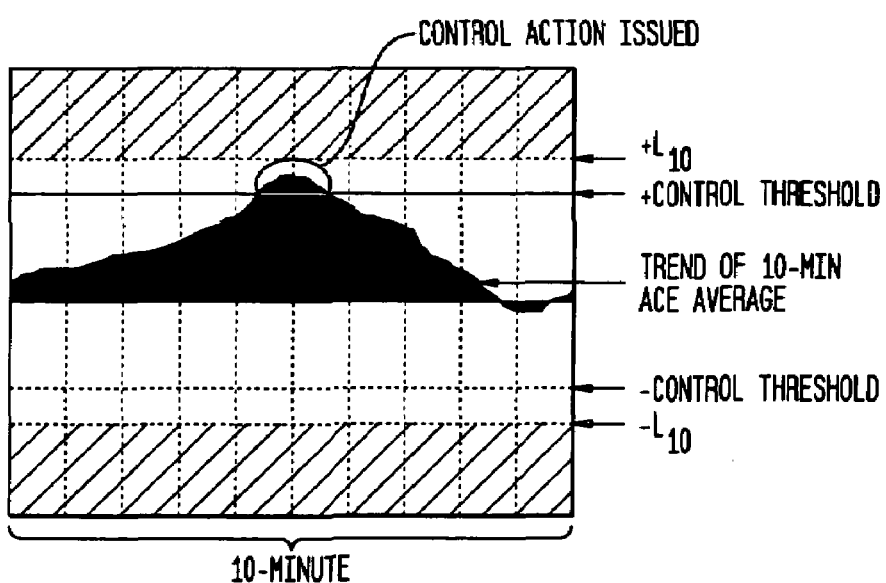
FIG. 4 illustrates a 10 minute window of ACE variances about a CPS2 control threshold L10.

As a secondary NERC requirement, CPS2 performance standard requires that the average ACE for each of the six ten-minute periods during the hour must be within specific limits referred to as L10 and calculated by the following equation:

$$AVG_{10\text{-}minute}ACE_i \leq L_{10} \quad (4)$$

$$L_{10}=1.65\epsilon_{10}\sqrt{(-10\beta i)(-10\beta s)} \quad (5)$$

where ACEi is the instantaneous tie-line bias ACE value, 1.65 is a constant used to convert the frequency target to 90% probability, $\epsilon_{10}$ is the constant derived from the targeted frequency bound. The bound $\epsilon_{10}$ is the same for every control area within an interconnection, $\beta_i$ is the frequency bias of the control area and $\beta_s$ is the sum of frequency bias settings of the control areas in the respective interconnection. Similar to the CSP1 module, the CSP2 module also has an enterable control threshold that can be based on past CPS2 performance. The CPS2 module issues correction signals when the 10-minute average ACE exceeds the control threshold. For example and as shown in FIG. 4, generation of a control signal is necessary when the 10-minute average ACE exceeds the control limits (thresholds). However, it should be understood that because the $L_{10}$ value is based on the current 10-minute period averaged ACE value, the CPS2 and L10 values are dynamic in nature.

The CPS2 module 1120 uses the time remaining in the 10-minute period to determine the magnitude of the needed correction on the power system. Moreover, the CPS2 module 1120 uses additional considerations, such as historical data to prevent excessive control due to the 10-minute ACE average being based on a small number of sample values. Additionally, the CPS2 module 1120 monitors the MW available during the remainder of the 10-minute period. If insufficient resources are available, an alarm is issued and the CPS2 module 1120 will ignore that ten minute period and focus instead on the next 10-minute period to prevent a consecutive violation. However, the CPS2 module 1120 may alternatively, issue an emergency alarm before the end of a 10-minute average period, when a very large ACE value above the L10 limits is detected. (See FIG. 4). Moreover, the CPS2 module 1120 may optionally also consider the performance trend as shown for example in FIG. 4, as a factor in determining whether an emergency alarm is warranted.

In comparison, it must be understood that CPS1 is a yearly standard that measures impact on frequency error with a compliance factor of 1 as its target value. On the other hand, CPS2 is a monthly standard that limits unscheduled flows within the L10 limits 90% of the time. As shown in FIGS. 3 & 4, maintaining compliance with these performance standards does not require a control area to exactly match, balance generation to load for each and every minute—small imbalances are permissible as are an occasional large imbalance.

The DCS module 1130 monitors the power system NERC defined disturbances such as sudden loss of generation or load, and calculates the necessary control actions necessary to return the system to pre-disturbance levels within the allowable recovery time. For purposes of disturbance compliance, a disturbance according to NERC is defined as an event whose magnitude is greater than or equal to 80% of the magnitude of the control area's most severe single contingency loss. However, load and generation excursions (e.g. pumped storage hydro, arc furnace, and rolling steel mills) that influence ACE are not reportable disturbance conditions. A control area may, at its discretion, measure its compliance based on the ACE measured ten minutes after the disturbance or based on the maximum ACE recovery measured within the ten minutes following the disturbance. Shown in Table 2 are illustrations of disturbance recovery times.

TABLE 2

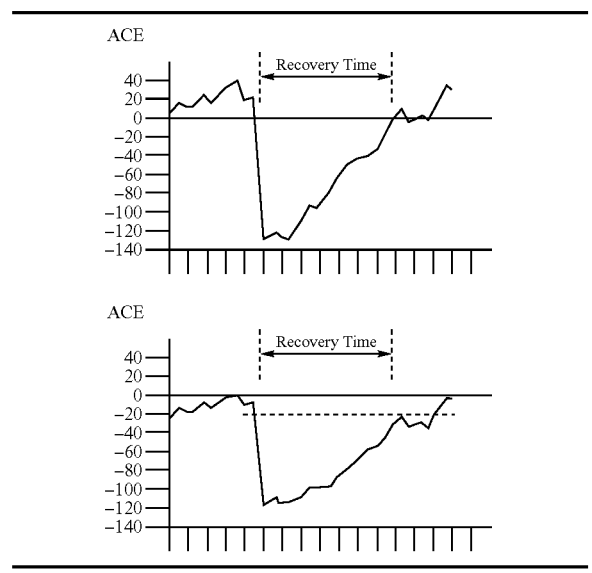

Operationally, the DCS module preferably takes action on the occurrence of events such as significant or sudden changes in generation, load or tie-line flow. To maintain balance, the DCS module 1130 determines the largest possible contingency loss (i.e., 80% magnitude) or alternatively allows the operator to enter a manual disturbance threshold. When a disturbance occurs, a timer is started which counts down the time remaining according to the DCS standard. The DCS module 1130 monitors and compares the data reported by the DCS reporting module 2040 to determine a course of action. In particular, the DCS module 1130 determines the available ramp rate and the time remaining in order for it to determine if enough resources are available for recovery. If insufficient resources are at hand, an additional alarm will be generated. After each disturbance event, a disturbance log entry is made to chronicle operator performance/information and NERC reporting requirements. When necessary the DCS module will take corrective action to return the ACE to Zero (0) or its pre-disturbance conditions.

DCS compliance generally requires the utilization of contingency reserves so as to recover the ACE value to zero or pre-disturbance value. In determining the course of action, the DCS module calculates the disturbance threshold, pre-disturbance average ACE, the magnitude of MW loss, maximum and minimum ACE during disturbance, ACE value at after a 10-minute period after disturbance, and/or a recovery percentage to attain recovery. Preferably, recovery from a reportable disturbance is completed when a control area's ACE value returns to zero, if its ACE value just prior to the disturbance was positive or equal to zero. If the ACE value just prior to the disturbance is negative, then the ACE value must return to its pre-disturbance value. However, the system operator may set the ACE value to zero or pre-disturbance levels.

The control decision (DC) module 1150 takes real-time input from the separate CPS real-time control modules (DCS, CPS2, and CPS1 modules), and makes decisions based on signal priority, expected future events (from DED 1500) such as interchange and generation schedules, as well as tunable gain factors.

The control signals generated from the DCS, CPS2, and CPS1 modules are used as input signals to decide a course of action and are given priorities, 1 (highest), 2(intermediate) and 3(lowest), respectively. The DCS control signal is given the highest consideration and given a priority value of 1, because a DCS violation or disturbance carries the greatest potential penalty to a control area. In the event that no disturbance event exists, the DC module 1150 then processes a CPS2 control signal (priority 2) to carry out CPS2 generation or other CPS2 compliance requirements. If CPS2 corrective requirements are unable to be met, for example due to limited resources or the time remaining within a 10-minute period, the DC module 1150 will ignore the current 10-minute period and focus instead on the next 10-minute period. This strategy is used to prevent excessive maneuvering of units and to minimize the occurrence of a subsequent CPS2 violation. Alternatively, if no DCS or CPS2 event exists, then the DC module 1150 will focus and evaluate CPS1 corrective action—for example, the amount of CPS1 requested MW generation.

After the DCA has determined the corrective action (i.e., MW generation), the DC module 1150 issues a command to the generation allocation (GA) module 1160 to implement the necessary regulation to available generators. The allocation of MW generation to available generators is based on assigned participation factors which are determined partially by look-ahead generator base point trajectories. As unit base points are adjusted by DED 1500 to accommodate load changes, the regulation requirements are reduced when possible by the CDA 1150 in order to keep the overall unit generation requirement stable and prevent excessive unit maneuvering.

The GA module 1160 distributes the total desired generation allocation to generating units by considering generating unit's operating mode, regulation participation factors assigned, ramping characteristics, prohibited regions, economic dispatch solution and the generating unit desired sustained generation set-point. More specifically, the GA module 1160 uses input data such as the total desired control area generation, unit sustained generation base points, unit actual generation (raw and filtered), as well as unit controller deadbands. The participation factor is based on regulating range and/or sustained rate of AGC controlled generating units. The distribution of regulation will then be done based on the participation factors. When possible however, the regulation will be distributed in increments that are greater than the unit controller deadbands. This will prevent regulation being allocated to units, but not being realized due to controller deadbands.

The non-conforming load processing (NCL) module 1140 is responsible for filtering non-controllable short-term load excursions created from loads such as arc furnaces, pumped storage, hydro, and rolling steel mills and to calculate a total non-conforming load MW value for use by the other CPS real-time control modules. In particular, the NCL module 1140 may utilize NCI telemetered MW values, NCL validity status, NCI shed status, NCL filter reset timer and/or NCL zero value timer to output a NCL filtered MW value, total NCL MW filtered value, total raw NCI MW value, ACE adjustment due to NCL and/or NCL zero value status. The processed non-conforming load may also be applied to the CPS2 and/or CPS1 modules.

The Very Short Term Load Prediction (VSTLP) module 1600 is a tool for predicting short term system loads. VSTLP module 1600 uses a set of neural networks to predict the system load for short term periods and in short term intervals, such as predicting the load of the system for the next 30-minutes, in 1-minute increments. The VSTLP module 1600 uses past load data and Short Term Load Forecast (STLF) data from STFL module 1650 (if available) to anticipate upcoming load trends in the next 15 minutes.

The VSTLP module 1600 uses artificial neural network (ANN) techniques to predict load requirements. Since load differs largely for weekdays and weekends, and varies among different weekdays, and has different dynamics from time to time during individual days, the ANN-based VSTLP module 1600 has the functional capability to among other features, distinguish between different seasons (for instance, summer and winter); distinguish between weekends, holidays and weekdays; distinguish between off-peak times and on-peak times; predict the next period (15 1-minute) load values which conform to the dynamics of recent time period(s) (for instance, the past 15 minutes); and to conform to the hourly average values of load that is forecasted by STLF module 1650 function or equivalent outside sources.

The VSTLP module 1600 will not directly take weather information as a consideration or input since such weather information is already accounted for and modeled by the STLF module 1650. However, it should be understood that day patterns may be obtained from weather adaptive load forecasts and/or manually entered. Nevertheless weather variation information will not be directly used (although other embodiments may) in the ANN-based VSTLP 1600, but the hourly forecasted load values by the STLF are to be used to adjust the minutely forecasted load values by the ANN-based VSTLP 1600.

To account for load changes along with seasons, weekdays/weekends/holidays, off-peak/on-peak times, the neural networks will be trained to capture the load patterns that occur at a specific season, a specific day, and a specific time period of the day. Initially, a year is split up into spring (Months 1 to 3), summer (months 4 to 6), fall (months 7 to 9) and winter (months 10 to 12). This split can be reconfigured according to real-world load characteristics at a specific location where this VSTL module 1600 is intended for use. Load shapes for weekends (Saturdays and Sundays) for example are dissimilar to those of weekdays (Mondays through Fridays). Division between weekdays and weekends may be performed and based on constructed, real world situations. For instance, weekends may include Saturdays, Sundays and Mondays, and weekdays may include Tuesdays through Fridays. Generally, load shapes for both weekdays and weekends are generally recurrent. However, the load shapes of holidays are quite different from those of normal weekdays/weekends. Special care must be given to the treatment of holidays, in particular, big holidays such as Thanksgiving holidays and Christmas holidays. Load shapes of neighboring days preceding holidays and following holidays are also affected. For example, the period from 6:00 pm on the day immediately preceding a holiday to 9:00 pm on the day immediately following the holiday will be regarded as holiday time when collecting data for training neural networks associated with VSTLP 1600.

Figure 5:
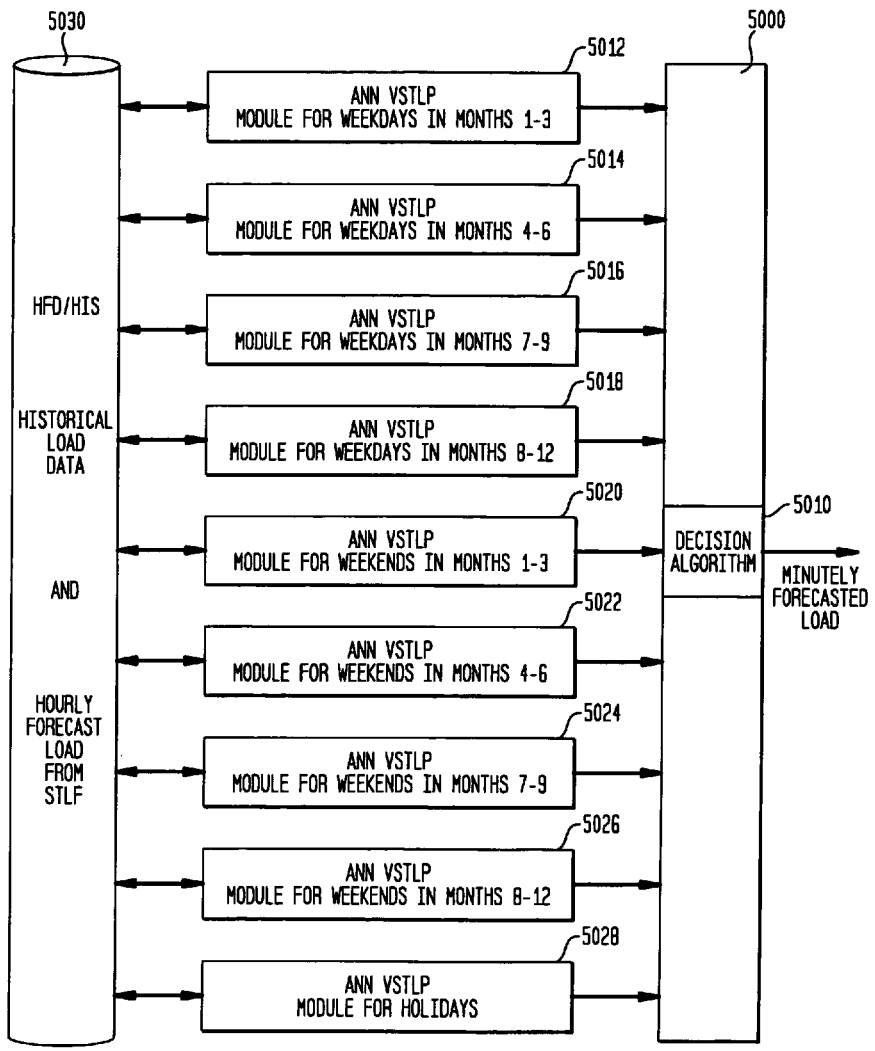
FIG. 5 illustrates an overall ANN-based VSTLP Architecture.
Figure 6:
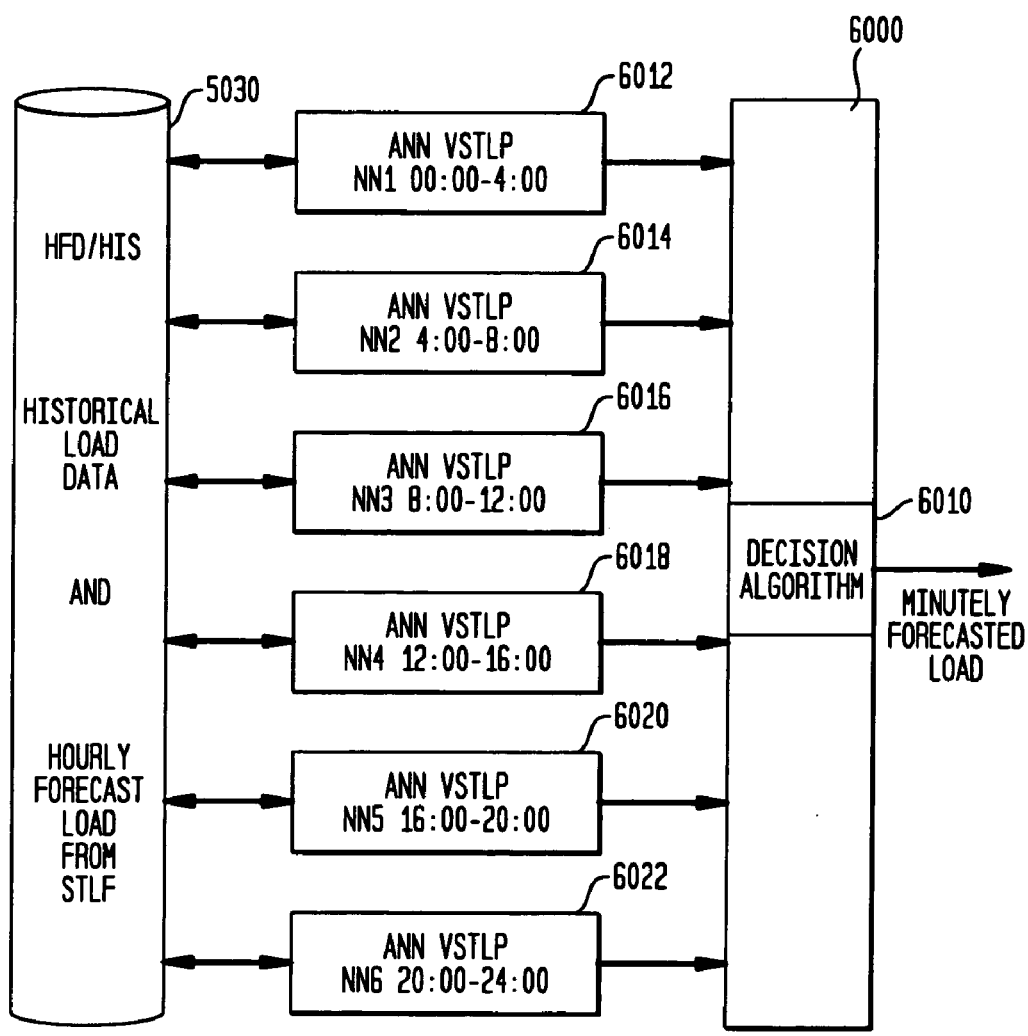
FIG. 6 illustrates a daily ANN-based VSTLP.

Shown in FIG. 5, is an ANN-based VSTLP architecture. The Decision Algorithm 5010 in FIG. 5, processes the forecasted load values from respective ANN VSTLP modules 5012 through 5028 (weekdays, months, weekends, and holidays), at the end of each time constraint and minimizes the effects due to ANN VSTLP module switching. The Decision Algorithm 5010 may be realized through the use of neural networks. Over a smaller time period and as shown in FIG. 6, for each individual day, 6 neural networks (NN1, NN2, NN3, NN4, NN5 and NN6) will be used to cover the 24-hour period (time period). In this embodiment each neural network is responsible for a 4-hour period (sub-period), although other time allocations and number of neural networks may be used. For instance, NN1, NN2, NN3, NN4, NN5 and NN6 cover 12:00am to 4:00am, 4:00am to 8:00am, 8:00am to 12:00pm, 12:00pm to 16:00pm, 16:00pm to 20:00pm, and 20:00pm to 12:00am, respectively. To ensure the smooth transition from one 4-hour period to the next 4-hour period, one additional half-hour is added to both ends of each 4-hour period. For instance, NN1 covers 11:30pm to 4:30am, and NN2 covers 3:30am to 8:30am. The split of the whole day into 6 different 4-hour periods reflects the fact that loads are dynamic during the day. It should be understood that different allocations of time, overlaps and number of neural networks may be used. The use of multiple neural networks for different periods of the day allows for more accurate predictions. Such a split may be changed to comply with the patterns of real situations. Accordingly, each ANN VSTLP module 5012–5028 shown in FIG. 5, will have several ANN to predict load corresponding to a specific time period-this is also shown in FIG. 6.

The Decision Algorithm 5010 in the Daily ANN-based VSTLP diagram shown in FIG. 6, processes the forecasted load values from respective ANN VSTLP modules at the end of each time constraint and minimizes the effects due to the ANN VSTLP module switching. The Decision Algorithm Block 6010 may also be realized through the use neural networks and may use linear or non-linear decision algorithm and neural network transfer functions. Each NN will be realized with one or two hidden layers depending on the complexity of load dynamics it has to learn. More specifically, one or more neurons may be used in each neural network with varying weights and biases, linear and non-linear transfer functions. It should be understood that the input is affected by the weights and biases assigned to each neuron.

In the equations below, load is denoted by P. The forecast load values for the next 15 minutes can be expressed as a function of the current load and the previous N 1-minute load values:

$$\hat{P}_{n+i} = f_i(n, P_n, P_{n-1}, P_{n-2}, \ldots, P_{n-N}) \quad (6)$$

Where $\hat{P}_{n+i}$ ($1 \leq i \leq M$) (7) is the predicted load for the future ith step (in minute) from current time n. $P_n$, $P_{n-1}$, $P_{n-2}$, ..., $P_{n-N}$ (8) are the actual load values for current time and the previous N minutes. In this illustration, M is assigned a value of 15. The choice of N depends on the complexity of load dynamics, and will be determined through a trial-and-error experimental approach along with any available a priori information on load dynamics.

It is observed that in the above equation, the dynamics is time varying. However, the time-varying effect may be neglected within any of the individual time periods that are properly segmented within a whole day of 24 hours (23 or 25 when DST is present). The load dynamics varies from one individual time period to another. Accordingly, several NNs are used to deal with time-varying load dynamics. Within each individual time period, the load dynamics can be simply represented by $$\hat{P}_{n+i} = f_i(P_n, P_{n-1}, P_{n-2}, \ldots, P_{n-N}) \quad (9)$$

The above equation can be rewritten in vector format as follows:

$$\begin{bmatrix} \hat{P}_{n+1} \\ \hat{P}_{n+2} \\ \vdots \\ \hat{P}_{n+M} \end{bmatrix} = \begin{bmatrix} f_1 \\ f_2 \\ \vdots \\ f_M \end{bmatrix} (P_n, P_{n-1}, P_{n-2}, \ldots, P_{n-N}) \quad (10)$$

Since $f_1, f_2, \ldots, f_M$ are all unknown, and the exact forms of these functions are not known, with historical load data available, a feed-forward neural network with proper layers may be trained to approximate such functions.

$$\begin{bmatrix} \hat{P}_{n+1} \\ \hat{P}_{n+2} \\ \vdots \\ \hat{P}_{n+M} \end{bmatrix} = NN(P_n, P_{n-1}, P_{n-2}, \ldots, P_{n-N}; \underline{\theta}) \quad (11)$$

Where $\underline{\theta}$ is a parameter vector that contains weights between neighboring layers, and biases for all the neurons, and is to be tuned in a way such that the discrepancy between the calculated values for the future times and actual values is minimized in terms a performance index.

Neural networks are trained off-line using historical load data. After the completion of neural network training and validation, they are ready to be used on-line. Retraining may be done on a daily basis to tune the weights to take into account the exhibited load characteristics for the just past day. Online update of weights may also be possible.

When actual values $P_n, P_{n-1}, P_{n-2}, \ldots, P_{n-N}$ (12) are available, forecasted load values $\hat{P}_{n+i}(1 \leq i \leq M)$ (13) can be computed immediately. When some of the actual values for $P_n, P_{n-1}, P_{n-2}, \ldots, P_{n-N}$ (14) are not available, estimates generated from ANN-based VSTLP at previous times will be used instead, and further future loads can be forecast. This can be done iteratively till all the minutely forecasted values for a whole hour are computed—this is shown in FIG. 7.

Figure 7:
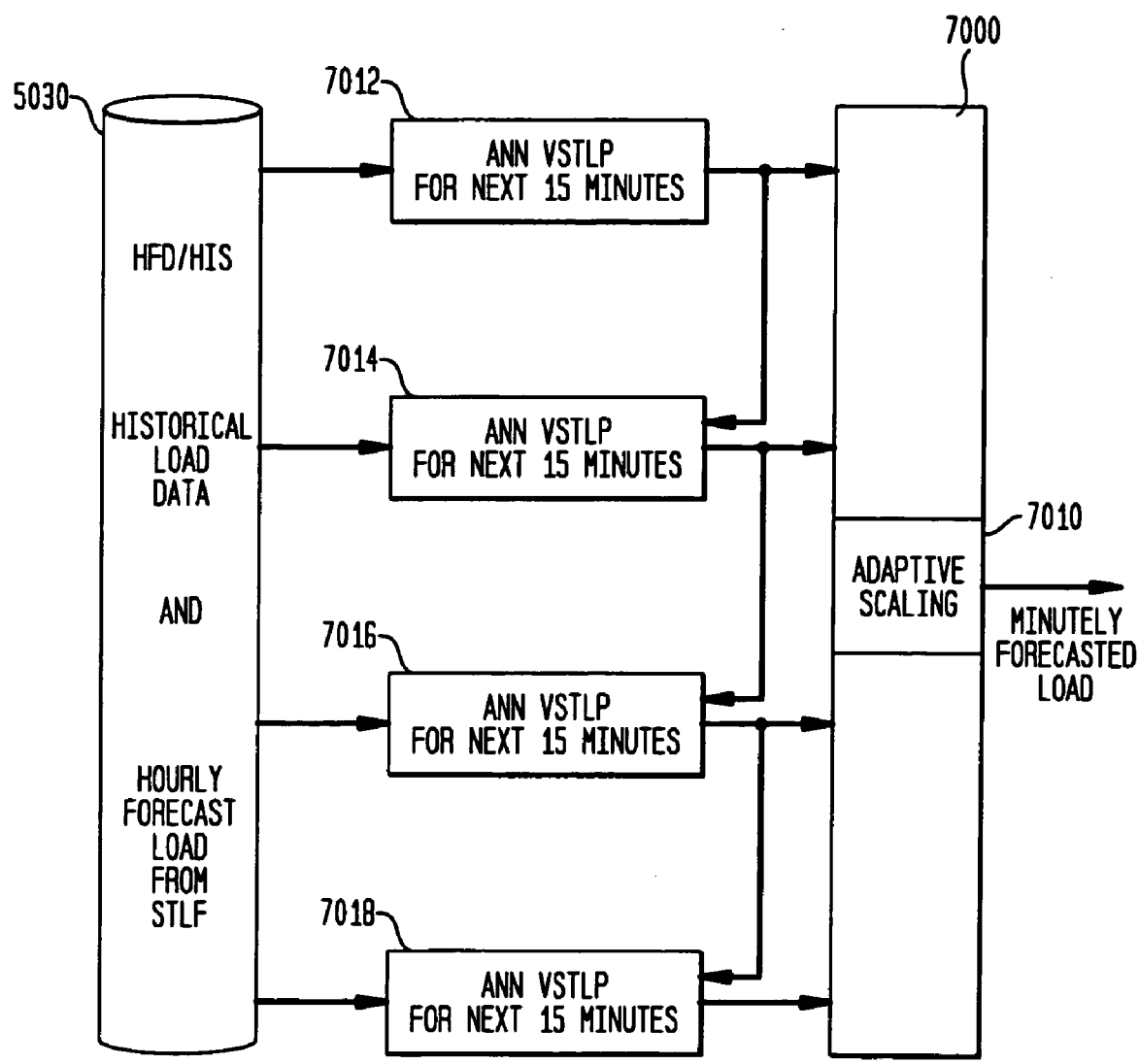
FIG. 7 illustrates an ANN-based VSTLP for Next Hour.

The Adaptive Scaling Block 7010 in the ANN-based VSTLP for Next Hour diagram FIG. 7 processes the incoming raw minutely forecasted load values from the four ANN-based VSTLP modules 7012–7018. Each of these VSTLP modules 7012–7018 is responsible for 15 minutes long prediction time interval, and for adaptive scaling, based on the hourly forecasted load values from the STLF.

It is assumed that the number of inputs, M, will not be larger than 15. Therefore, at any instant time n, and when starting to predict the load values for the next hour, the first ANN-based VSTLP will calculate the load values for the next 15 minutes, namely, $\hat{P}_{n+i}(1 \leq i \leq 15)$ (15), based on the actual previous load values. When predicting the load values for the time period from n+16 to n+30, the second ANN-based VSTLP will use some of the available minutely forecasted load values $\hat{P}_{n+i}(1 \leq i \leq 15)$ (16) since actual load values for this time period are not available yet. In the same manner, the predicted load values from the second ANN-based VSTLP for the time period from n+16 to n+30 are $\hat{P}_{n+i}(16 \leq i \leq 30)$ (17). Similarly, the third and fourth ANN-based VSTLPs will generate the predicted load values for another 15 minutes each, that is, $\hat{P}_{n+i}(31 \leq i \leq 45)$ (18), and $\hat{P}_{n+i}(46 \leq i \leq 60)$ (19). These four ANN-based VSTLPs all together generate predicted load values for the next 60 minutes. However, some of these forecasted load values will not be used in adaptive scaling if the time stamp associated with them is beyond the current hour. If the current time instant n is i minutes after the hour, then within the hour, for the time period from n−i+1 to n(18), $P_{n-i+1}, P_{n-i+2}, P_{n-i+3}, \ldots, P_n$ (20) actual values are available, and for the rest of the time period within the hour, only predicted values $\hat{P}_{n+k}(1 \leq k \leq 60-i)$ (21) are available. The forecasted load values $\hat{P}_{n+k}(60-i+1 \leq k \leq 60)$ (22) will be discarded or prediction for the corresponding time period will not be performed at all depending on the eventual implementation.

For example, let the scaling factor be $S_n$, and let the hourly forecasted load value from STLF 1650 for the current hour be $P_{stlf}$. To make the minutely forecasted load values within the hour conform to the hourly forecasted load value from STLF with satisfactory accuracy, the following relationship is used:

$$\sum_{k=-i+1}^{0} P_{n+k} + S_n \sum_{k=1}^{60-i} \hat{P}_{n+k} = P_{stlf} \quad (23)$$

and thus, $$S_n = \frac{P_{stlf} - \sum_{k=-i+1}^{0} P_{n+k}}{\sum_{k=1}^{60-i} \hat{P}_{n+k}} \quad (24)$$

Then the modified minutely forecasted load values for the future time period from n+1 to n+60−i (25) within the current hour are $S_n \hat{P}_{n+k}(1 \leq k \leq 60-i)$ (26). It should be understood however, that $S_n$ is time varying with the minutely update of 15-minute sliding window of prediction. The temporal behavior of $S_n$ is also an indicator of ANN-based VSTLP's performance. If $S_n$ fluctuates around 1 with a small magnitude (or substantially around 1), it indicates that the ANN-based VSTLP performs reasonably well in the sense that the minutely forecasted load values generated from ANN-based VSTLP conform to the hourly forecasted load values from STLF 1650 with the assumption that STLF 1650 fully captures the hourly load patterns with satisfactory accuracy. In addition, it should be noted that non-conforming load(s) must be dealt and processed separately, or filtered out to minimize or remove its influence on the prediction accuracy of the ANN-based VSTLP. Moreover, in certain instances the STLF 1650 should be greater than the largest prediction interval for which load predictions are made.

The historical load data stored in HFD/HIS 5030 must be formulated in a proper format before it can be used in training neural networks of the ANN-based VSTLP. This can be achieved by an interface program, which retrieves the historical data from HFD/HIS, reformats it and passes it to the main program responsible for neural network training. The historical data is preferably separated into two different sets. The first set of data is used to train the neural networks while the second set of data is used to evaluate the performance of the trained neural networks to avoid the over-training of the neural networks. Based on performance evaluation, the number of training epochs can be specified and final training can be achieved with all available and useful historical data. Information relating to the ANN-based VSTLP 1600, for example, the number of layers, number of neurons in each layer, activation functions, weights and biases, etc., will be saved in a file.

The structural and parametric information about the ANN-based VSTLP 1600 is retrieved to initialize neural networks of the ANN-based VSTLP. Same as for VSTLP offline training, an interface program retrieves historical load data from HFD/HIS 5030 or other online application programs that temporarily stores historical load data and passes it to the initialized neural networks for load forecast. Generated minutely forecasted load values will be used for generation, scheduling, and display purposes. In addition these load values will also be stored for after-the-fact performance evaluation.

Online updating of weights and biases of the neural networks can be done by using the immediately past actual load values and the forecasted load values generated from the neural networks. This is done with the understanding that past load characteristics may be used to improve the accuracy of immediate future load predictions. Beyond a certain time period (e.g., a time segment that is defined for example by the Daily ANN-based VSTLP diagram), the weights and biases are discarded, and the original weights and biases are reloaded. Updating of weights and biases can also be achieved on a weekly or monthly basis depending on real world situations.

The Dynamic Economic Dispatch (DED) module 1500 utilizes ramping constraints of generating units that are dispatchable over a consecutive set of time intervals. The objective of DED 1500 is to produce optimal generation output trajectories for each participating generating unit so that the overall system resource optimization over a period of time spanning a number of consecutive time intervals can be achieved. DED module 1500 utilizes and takes into consideration, system power balance, system spinning reserve requirement, power output limits and ramp rate limits of the generating units for the dispatch time period. DED module 1500 assigns energy and reserve obligations among the committed resources most economically so that the integrated cost of the power production over the specified dispatch time period (e.g. 30 minutes look-ahead time horizon) can be minimized.

Figure 8:
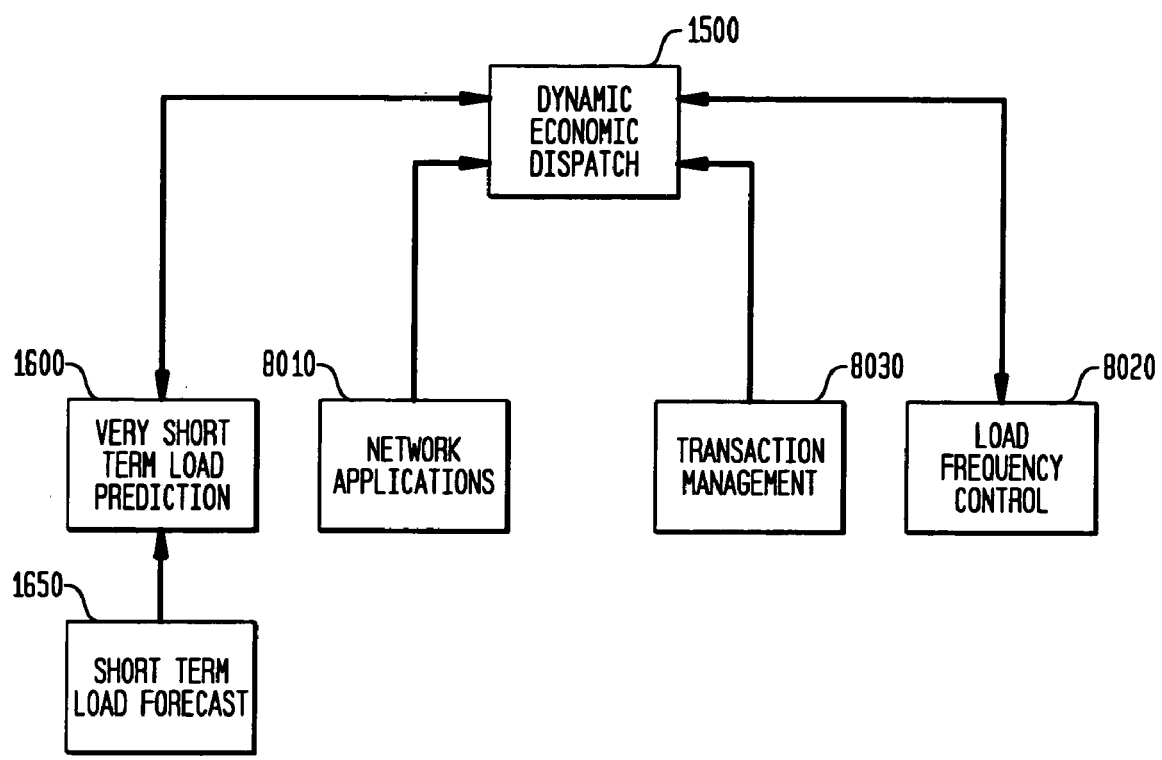
FIG. 8 illustrates the DED with inputs from energy management modules.
Figure 9:
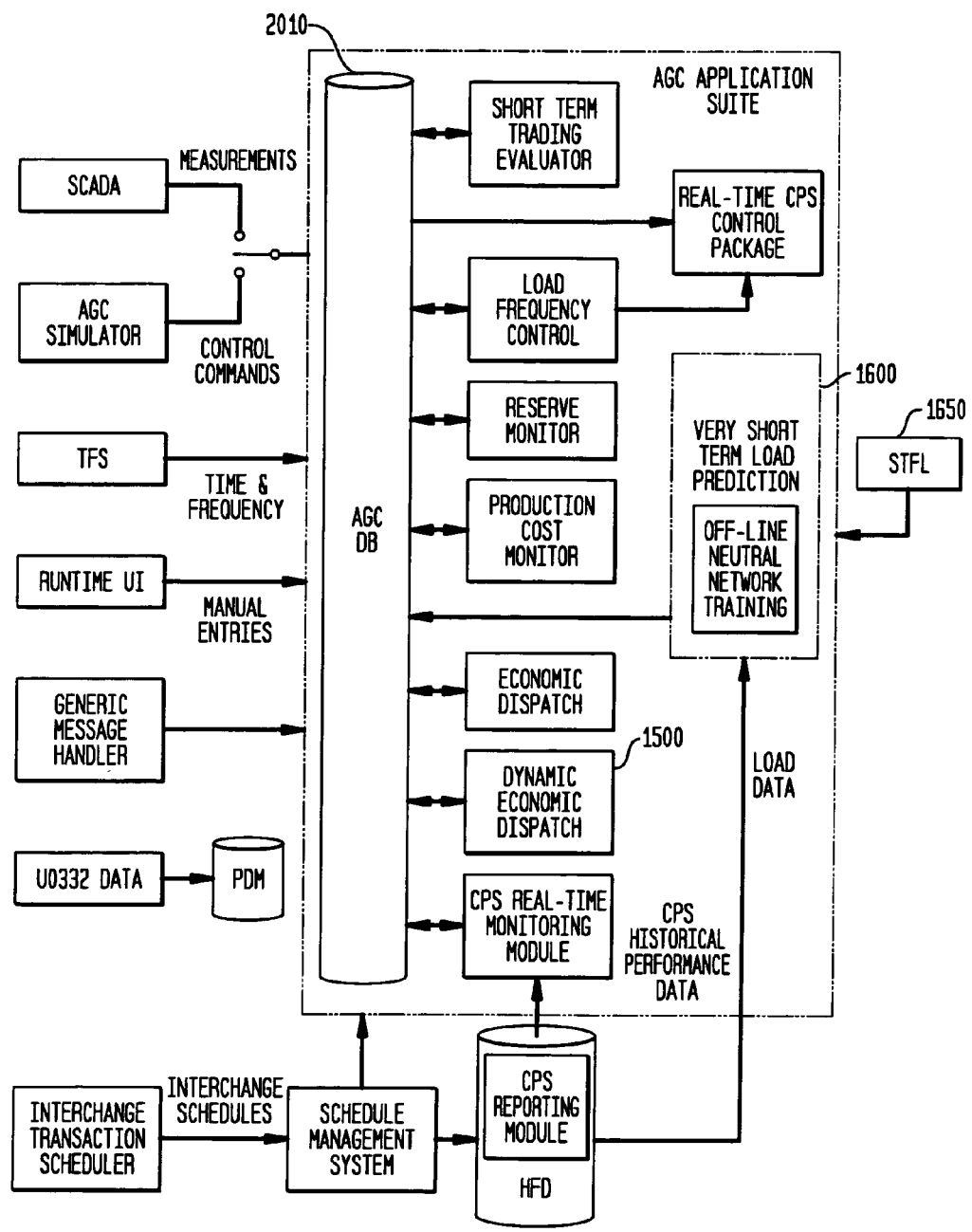
FIG. 9 illustrates the DED in a CPS based AGC.

As shown in FIGS. 8 & 9, DED module 1500 uses the predicted load profile for the time period of dispatch interest that is generated by the VSTLP module 1600 as the projected system load demand in the near future. Optimal values for power outputs of generating units that are calculated by the DED module 1500 are sent to the Load Frequency Control (LFC) module 8020 as base points for the generating units. The constantly changing ACE caused by the net interchange deviation and interconnection frequency deviation are regulated preferably within a predetermined range around zero, instead of towards zero, in order that regulation efforts may be reduced while NERC mandated CPS criteria are met as well as a reduction in the number of unit reversals.

Figure 10:
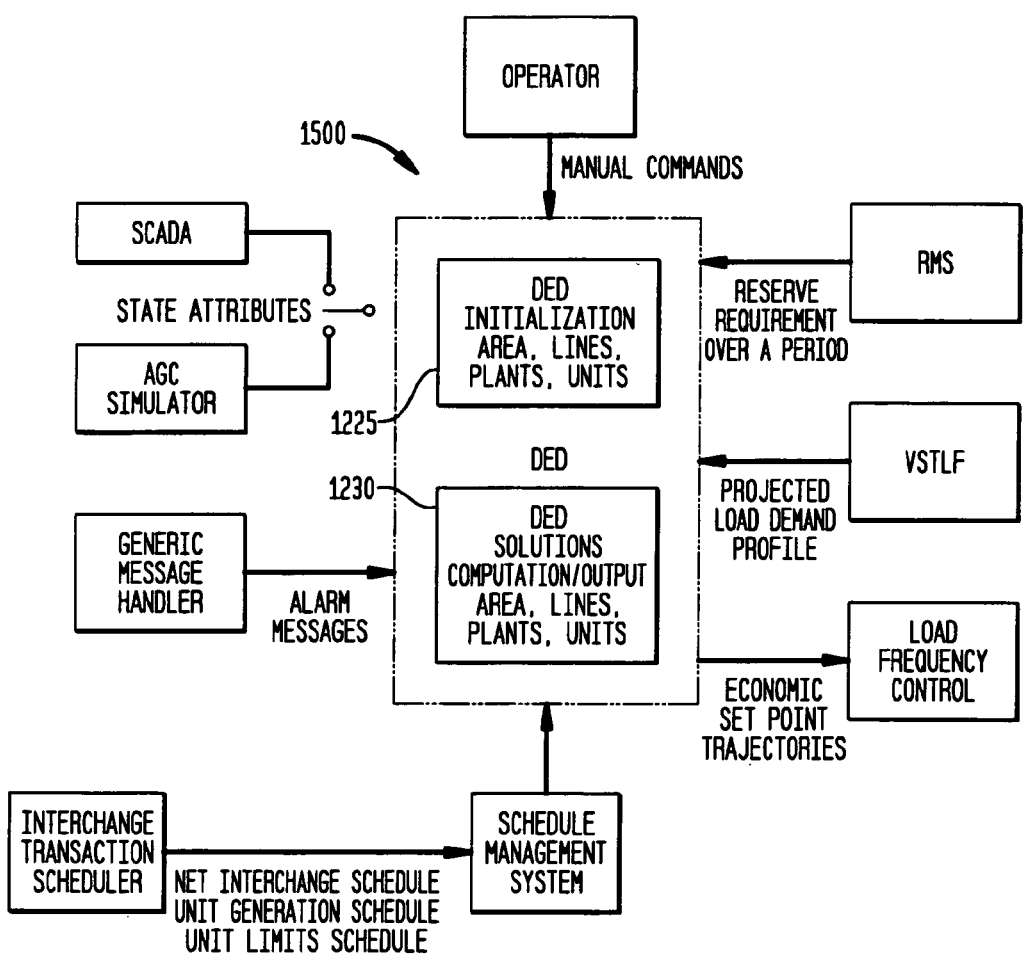
FIG. 10 is a diagram of the functional relationship of the DED and other energy management modules.

As shown in FIG. 10, the DED module 1500 comprises a Data Initialization (DI) 1225 and a DED solution module 1230. The DI module 1225 initializes internal data structures (within the DED scope) that include generating unit attributes. DI module 1225 is also responsible for initialization of projected system load profiles, system spinning reserve requirements and net interchange schedules for each time interval of a dispatch time period. Initialization of internal structure of generating unit includes initialization of unit's operating mode, power output limits and ramping rate limits from a generating unit's generation schedule. From the generation schedule, unit parameters such as unit fuel type selection, unit fuel cost for fuel type selected, unit topping fuel cost and MW breakpoint, unit incremental heat rate curve, unit efficiency factor, and unit incremental maintenance cost will be used to construct incremental cost curves for each interval of the dispatch time period as part of initialization.

The DED solution (DS) module 1230 performs dynamic economic dispatch solutions and calculates unit base-point trajectories. The solution approach seeks the feasible solution in a two-level hierarchy. The higher level looks ahead, calculates possible violations, and makes adjustments to correct the violations. The lower level performs economic dispatch with adjusted "generation to be dispatched" to allocate generation and reserve in the most economic manner. This sub-function comprises the following essential functionalities: 1) control area dispatch to coordinate unit level dispatch over a dispatch time horizon and calculate system level economic benefits; 2) unit dispatch to calculating optimal unit generation, optimal unit reserve, and unit production cost; optimization model formulation to create mathematical models for optimization; 3) and optimization computation core to performing minimization of the overall control area total cost integrated over the dispatch time horizon based on the established optimization model.

Operationally, a mechanism is provided to access the AGC database 2010 and retrieve required information and store the information within the application. The required information is also used to initialize the core DED program that performs all optimization calculations. In addition, ICC curves are constructed for each interval of the entire dispatch time horizon. Because a generating unit may have multiple Incremental Heat Rate (IHR) curves associated with it, an operator may individually select the curve to be used for that generating unit. Each generating unit IHR curve is represented piecewise linear monotonically increasing segments. Moreover, several fuel types are supported for each unit and the operator may also select the fuel type to be used. Associated with each fuel type is a fuel cost which may also be changed by the operator. The selected fuel cost becomes the base fuel cost and is applied to the entire range of the IHR curve. For generating units that use topping fuels, the selected base fuel cost only applies to the range of the IHR curve up to the MW breakpoint and the topping fuel is used thereafter. The topping fuel cost must be greater than the base fuel cost to ensure that the resultant incremental cost curve is monotonically increasing. In addition, the operator may modify the incremental maintenance cost or efficiency factor for any unit. The incremental cost curve calculated from the selected incremental heat rate curve is as follows:

$$IC_i^t = IMC_i^t + IHR_i^t \times FC_i^t / EF_i^t \qquad (27)$$

Where $IC_i^t$ denotes the incremental cost, $IMC_i^t$ the incremental maintenance cost, $IHR_i^t$ the incremental heat rate, $FC_i^t$ the fuel cost, $EF_i^t$ the efficiency factor, respectively; the subscript i is the unit index and the superscript is the index of time intervals.

Functionally, all inputs to the DI module 1225 are preferably read from the AGC database 2010 and ICC curves are constructed while all outputs are sent to the DS module. The DS module 1230 creates an optimization model(s), and performs optimization calculations that include for example, unit level optimization, plant level optimization, control area level optimization while respecting power flow limits, reserve requirements, power balance, ramp rate limits.

In carrying out its tasks, the DS module 1230 preferably operates within determined or select boundaries, establishes a Security Constrained Dynamic Economic Dispatch model, performs cost minimization at both control area level and generating unit level, operates with system level and unit level constraints such as system power balance and spinning reserve requirements for each time interval of the dispatch time horizon, supports piecewise linear and staircase non-decreasing ICCs, generating power limits, power limits, ramp rate limits, spinning reserve limits; calculates optimal system level generation, reserve, and production costs; and calculates optimal unit level generation, reserve and production costs.

To achieve the above functionalities and within these constrains, Lagrange Relaxation approach and Dantzig-Wolfe Decomposition are used. Dantzig-Wolfe Decomposition coupled with a revised simplex method provides a solution to the conventional SCED problem and can be used for solving a number of SCEDs corresponding to individual time intervals. Lagrange Relaxation is used to coordinate the solutions among different SCEDs coupled with ramping constraints. The Dynamic Economic Dispatch problem can be mathematically formulated as follows:

Minimize $$SystemCost = \sum_{t \in T} \sum_{unit \in U_A} (StatCost_{unit}^t(P_{unit}^t)) \qquad (28)$$

Subject to the following constraints:
Power balance:

$$\sum_{unit \in U_A} (P_{unit}^t / pf_{unit}^{SE}) = P_{load}^t + NeInt_{CA}^t; t \in T \qquad (29)$$

Reserve requirement:

$$\sum_{unit \in U_A} R_{unit}^t \geq R_{req}^t; t \in T \quad (30)$$

Line constraints:

$$-P_{line}^{max} \leq P_{line}^t = P_{line}^{SE} + \sum_{unit \in U_A} SF_{unit}^{SE} \cdot (P_{unit}^t - P_{unit}^{SE}) \leq P_{line}^{max}; t \in T \quad (31)$$

Plant limits:

$$P_{plant}^t = \sum_{unit \in U_p} P_{unit}^t \leq P_{plant}^{max}; t \in T \quad (32)$$

Unit ramp rate limits: $\Delta P_{unit}^{Dn} \leq \Delta P_{unit}^t = P_{unit}^t - P_{unit}^{t-1} \leq \Delta P_{unit}^{Up}$; t∈T
Unit power limits: $P_{unit,EffMin} \leq P_{unit}^t \leq P_{unit,EffMax}$; t∈T (33)
Unit capacity limits: $R_{unit}^t + P_{unit}^t \leq P_{unit,OpMax}$; t∈T (34)
Unit reserve limits: $0 \leq R_{unit}^t \leq R_{unit,Max}$; t∈T(35)

Where
$P_{unit}^t$ is unit power generation at time interval t;
$\Delta P_{unit}^t = P_{unit}^t - P_{unit}^{t-1}$ is unit ramping at time interval t;
$StatCost_{unit}^t(\bullet)$ is unit operation cost at time interval t;
t is any time interval of the dispatch time horizon;
T is the dispatch time horizon that can be represented by $T=\{t|t=t_1, t_2, \ldots, t_N\}$ where $t_1, t_2, \ldots, t_N$ are N consecutive time intervals in the forward time order; for notation convenience, define $t_{i-1}=t_i-1$ where i=1,2, . . . ,N with the understanding that $t_0$ representing the current (real-time) time interval;
$U_A$ is the set of units belonging to a control area;
$U_P$ is the set of units belonging to a power plant;
$P_{unit}^t$ is unit power generation at time interval t;
$pf_{unit}^{SE}$ is unit penalty factor (superscript SE stands for State Estimator of NA);
$R_{unit}^t$ unit is unit spinning reserve at time interval t;
$P_{load}^t$ is system load at time interval t;
$NetInt_{CA}^t$ is Control Area net interchange at time interval t;
$R_{req}^t$ is spinning reserve requirement at time interval t;
$P_{unit}^{SE}$ is unit estimated power generation at time interval t;
$P_{line}^t$ is line power flow at time interval t;
$P_{line}^{SE}$ is line estimated power flow at time interval t;
$SF_{line:unit}^{SE}$ is unit estimated shift factor for line;
$P_{line}^{max}$ line is line capacity;
$P_{plant}^t$ is plant power generation at time interval t;
$P_{plant}^{max}$ plant is plant power generation limit;
$P_{unit,EffMin}, P_{unit,EffMax}$ are unit power output effective low/ high limits;
$\Delta P_{unit}^{Dn}, \Delta P_{unit}^{Up}$ are unit Up and Down ramping limits;
$P_{unit,OpMax}$ is unit Operating Maximal limit;
$R_{unit,Max}$ is spinning reserve maximal limit.

Lagrange Relaxation

The Lagrange Relaxation methodology is used to dualize ramping constraints using multipliers $\rho_{unit}^{t;Up}$ for upward ramping limits and $\rho_{unit}^{t;Dn}$ for downward ramping limits. The DED problem can be expressed in the equivalent form:

$$\max_{\rho_{unit}^{t;Up}; \rho_{unit}^{t;Dn} \geq 0} \min_{P_{unit}^t} \{\sum_{t \in T} \sum_{allunits} C_{unit}^t(P_{unit}^t) + \rho_{unit}^{t;Up}(P_{unit}^t - P_{unit}^{t-1} - \Delta P_{unit}^{Up}) - \quad (36)$$
$$\rho_{unit}^{t;Dn}(P_{unit}^t - P_{unit}^{t-1} - \Delta P_{unit}^{Dn})|P_{unit}^t \in \mathfrak{I}_{SCED}^t\}$$

where $P_{unit}^t \in \mathfrak{I}_{SCED}^t$ presents all static SCED constraints at time interval t, and $P_{unit}^{t-1}$ for $t=t_1$ represents $P_{unit}^{t_0}$ with $t_0$ being the current time interval (actual values associated with $t_0$ are available, for instance, $P_{unit}^{t_0}$ is the actual power output of the unit). Using Lagrange function:

$$L(\rho_{unit}^{t;Up}, \rho_{unit}^{t;Dn}) = \rho_{unit}^{t;Dn} \cdot \Delta P_{unit}^{Dn} - \rho_{unit}^{t;Up} \cdot \Delta P_{unit}^{Up} + \quad (37)$$
$$\min_{P_{unit}^t} \{\sum_{t \in T} \sum_{allunits} (C_{unit}^t(P_{unit}^t) + \rho_{unit}^{t;Up}(P_{unit}^t - P_{unit}^{t-1}) -$$
$$\rho_{unit}^{t;Dn}(P_{unit}^t - P_{unit}^{t-1}))|P_{unit}^t \in \mathfrak{I}_{SCED}^t\}$$

the DED dual problem becomes simple optimization:

$$\max_{\rho_{unit}^{t;Up}; \rho_{unit}^{t;Dn} \geq 0} L(\rho_{unit}^{t;Up}; \rho_{unit}^{t;Dn}); t \in T. \quad (38)$$

In formulating the DED problem in this manner, it can be solved by iterative solution of SCED problem and Lagrange dual problem. The SCED problem is:

$$\min_{P_{unit}^t} \left\{ \sum_{t \in T} \sum_{allunits} \left( C_{unit}^t(P_{unit}^t) + \rho_{unit}^{t;Up}(P_{unit}^t - P_{unit}^{t-1}) - \rho_{unit}^{t;Dn}(P_{unit}^t - P_{unit}^{t-1}) \right) \quad (39)$$
$$|P_{unit}^t \in \mathfrak{I}_{SCED}^t \right\} =$$
$$\min_{P_{unit}^t} \left\{ \sum_{t \in \{t_N\}} \sum_{allunits} C_{unit}^t(P_{unit}^t) + \sum_{t \in T - \{t_N\}} \sum_{allunits} (C_{units}^t(P_{unit}^t) + \right.$$
$$(\rho_{unit}^{t;Up} - \rho_{unit}^{t+1;Up})P_{unit}^t - (\rho_{unit}^{t;Dn} - \rho_{unit}^{t+1;Dn})P_{unit}^t)|$$
$$\left. P_{unit}^t \in \mathfrak{I}_{SCED}^t \right\} + (\rho_{unit}^{t_1;Dn} - \rho_{unit}^{t_1;Up})P_{unit}^{t_0}$$

i.e.:

$$\min_{P_{unit}^t} \left\{ \sum_{t \in \{t_N\}} \sum_{allunits} C_{unit}^t(P_{unit}^t) + \quad (40)$$
$$\sum_{t \in T - \{t_N\}} \sum_{allunits} (C_{units}^t(P_{unit}^t) + (\rho_{unit}^{t;Up} - \rho_{unit}^{t+1;Up})P_{unit}^t -$$
$$(\rho_{unit}^{t;Dn} - \rho_{unit}^{t+1;Dn})P_{unit}^t)|P_{unit}^t \in \mathfrak{I}_{SCED}^t \right\}$$

This problem consists of time interval independent static SCED problems:

$$\min_{P_{unit}^t} \{ \sum_{allunits} (C_{unit}^t(P_{unit}^t) + (\rho_{unit}^{t;Up} - \rho_{unit}^{t+1;Up})P_{unit}^t - (\rho_{unit}^{t;Dn} - \rho_{unit}^{t+1;Dn})P_{unit}^t) \quad (41)$$
$$|P_{unit}^t \in \mathfrak{I}_{SCED}^t\}; t \in T - \{t_N\}$$

$$\min_{P_{unit}^t} \{ \sum_{allunits} C_{unit}^t(P_{unit}^t)|P_{unit}^t \in \mathfrak{I}_{SCED}^t\}; t \in \{t_N\}$$

Only objective functions for these SCED problems are modified by Lagrange multipliers $\rho_{unit}^{t;Up}$ and $\rho_{unit}^{t;Dn}$.

Under these formulations, Lagrange coordination can be performed through the following steps:
1. Initialization: set all $\rho_{unit}^{t;Up}$ and $\rho_{unit}^{t;Dn}$ to be zero
2. Coordination: for all t∈T solve Lagrange dual problem to update multipliers $\rho_{unit}^{t;Up}$ and $\rho_{unit}^{t;Dn}$
3. SCED Solution: for all t∈T solve SCED for given $\rho_{unit}^{t;Up}$ and $\rho_{unit}^{t;Dn}$
4. Optimality: check optimality conditions
5. Iteration: continue with step 2.

Lagrange Dual Problem Solution Alternatives 1 & 2

Alternative 1

Lagrange dual problem:

$$\max_{\rho_{unit}^{t;Up},\rho_{unit}^{t;Dn}\geq 0} L(\rho_{unit}^{t;Up};\rho_{unit}^{t;Dn}); t \in T$$

is separable by time intervals t∈T Lagrangian function is concave and piecewise differentiable. The optimal values of multipliers $\rho_{unit}^{t;Up}$ and $\rho_{unit}^{t;Dn}$ must satisfy the first order condition:

$$(0,0)\in\partial L(\rho_{unit}^{t;Up};\rho_{unit}^{t;Dn}); t\in T$$

The sub-gradient ∂L contains the violations of ramping limits at each time interval t∈T $$(P_{unit}^{t}-P_{unit}^{t-1}-\Delta P_{unit}^{Up},P_{unit}^{t}-P_{unit}^{t-1}-\Delta P_{unit}^{Dn})\in\partial L \\ (\rho_{unit}^{t;Up};\rho_{unit}^{t;Dn}); t\in T \quad (42)$$

Note that at one time interval only one ramping violation can occur. The dual problem optimality conditions become:

$$P_{unit}^{t}-P_{unit}^{t-1}-\Delta P_{unit}^{Up}=0 \text{ if } \rho_{unit}^{t;Up}>0; \text{ and } P_{unit}^{t}-P_{unit}^{t-1}-\Delta P_{unit}^{Up}>0 \text{ if } \rho_{unit}^{t;Up}=0 \quad (43)$$

$$P_{unit}^{t}-P_{unit}^{t-1}-\Delta P_{unit}^{Dn}=0 \text{ if } \rho_{unit}^{t;Dn}>0; \text{ and } P_{unit}^{t}-P_{unit}^{t-1}-\Delta P_{unit}^{Dn}>0 \text{ if } \rho_{unit}^{t;Dn}=0 \quad (44)$$

These statements provide that optimal values of Lagrange multipliers force ramping constraints to be critical or redundant. As such, the Lagrange dual problem can be solved using one-dimensional sub-gradient method. In this case sub-gradient method presents the following rules:
1. if the ramping constraint is violated then increase its Lagrange multiplier
2. if the Lagrange multiplier is positive and ramping constraint redundant then decrease its Lagrange multiplier; and
3. if Lagrange multiplier is zero and ramping constraint redundant then keep its Lagrange multiplier at zero.

These rules define only the direction of Lagrange multiplier update, but not amount of change. Instead of the customarily used fixed proportional update known as step length, the direction taken is to use a customized approach.

Figure 11:
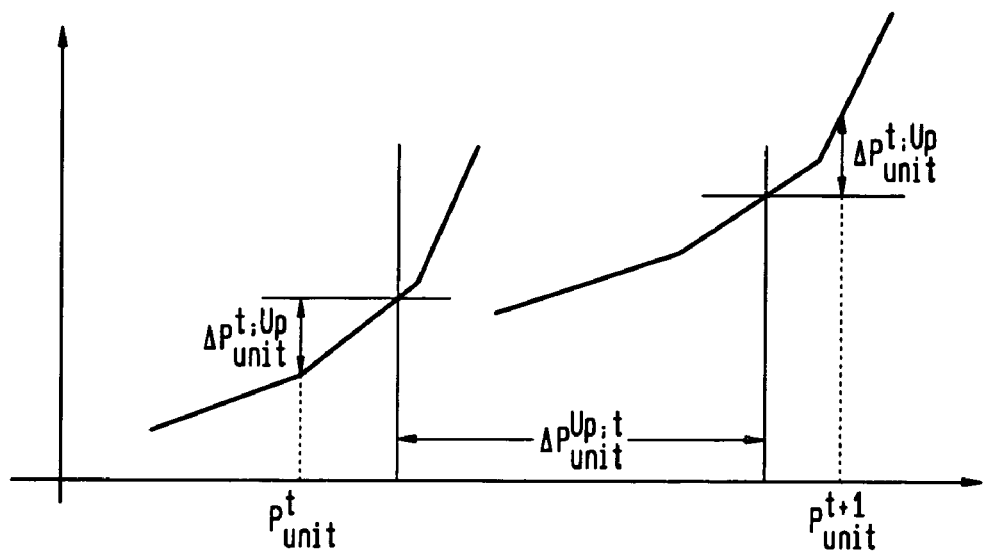
FIG. 11 is a plot of the relationship between a change in the Lagrange Multiplier and corresponding output power.

Lagrange multiplier increasing $\Delta\rho_{unit}^{t;Up}$ for upward ramping constraint at time interval t will cause increasing of unit incremental costs at time interval t−1, and decreasing of unit incremental costs at time interval t. The update should eliminate ramping constraint violation. Similarly, Lagrange multiplier increasing $\Delta\rho_{unit}^{t;Dn}$ for downward ramping constraint at time interval t will cause increasing of unit incremental costs at time interval t, and decreasing of unit incremental costs at time interval t−1. These relationships are illustrated in the diagram shown in FIG. 11. This solution can be calculated using the following algorithm:
1. check if there are any violations of ramping constraints.
2. loop through the set of units for violation of upward ramping constraints,
3. set $P_{unit}^{t-1;Up}=P_{unit}^{t-1}; P_{unit}^{t;Up}=P_{unit}^{t}$;
4. put $P_{unit}^{Up}$ in the middle of segment $[P_{unit}^{t-1;Up};P_{unit}^{Up}]$;
5. calculate unit incremental costs for t−1 and t time intervals at the end points of segment $\Delta P_{unit}^{Up}$;
6. select smaller of $\Delta\rho_{unit}^{t-1;Up}$ and $\Delta\rho_{unit}^{t;Up}$ and reduce segment $[P_{unit}^{t-1;Up};P_{unit}^{t;Up}]$ using that update;
7. repeat steps 3 to 5 several times (even one pass can be sufficient) until no violation of the ramping constraint;
8. update Lagrange multipliers $\rho_{unit}^{t;Up}+\Delta\rho_{unit}^{t;Up}$.
9. loop through the set of units for overly penalization on upward ramping,
10. set $P_{unit}^{t-1;Up}=P_{unit}^{t-1}; P_{unit}^{t;Up}=P_{unit}^{t}$;
11. put $\Delta P_{unit}^{Up}$ centered around segment $[P_{unit}^{t-1;Up};P_{unit}^{t;Up}]$;
12. calculate unit incremental costs for t−1 and t time intervals at the end points of segment $\Delta P_{unit}^{Up}$;
13. select smaller of $\Delta\rho_{unit}^{t-1;Up}$ and $\Delta\rho_{unit}^{t;Up}$ and enlarge segment $[P_{unit}^{t-1;Up};P_{unit}^{t;Up}]$ using that update;
14. repeat steps 11 to 13 several times (even one pass can be sufficient) until the ramping constraint is binding;
15. update Lagrange multipliers $\rho_{unit}^{t;Up}-\Delta\rho_{unit}^{t;Up}$.
16. loop through the set of units for violation of downward ramping constraints,
17. set $P_{unit}^{t-1;Dn}=P_{unit}^{t-1}; P_{unit}^{t;Dn}=P_{unit}^{t}$;
18. put $\Delta P_{unit}^{Dn}$ in the middle of segment $[P_{unit}^{t-1;Dn};P_{unit}^{t;Dn}]$;
19. calculate unit incremental costs for t−1 and t time intervals at the end points of segment $\Delta P_{unit}^{Dn}$;
20. select smaller of $\Delta\rho_{unit}^{t-1;Dn}$ and $\Delta\rho_{unit}^{t;Dn}$ and reduce segment $[P_{unit}^{t-1;Dn};P_{unit}^{t;Dn}]$; using that update;
21. repeat steps 18 to 20 several times (even one pass can be sufficient);
22. update Lagrange multipliers $\rho_{unit}^{t;Dn}+\rho_{unit}^{t;Dn}$. loop through the set of units for overly penalization on downward ramping,
23. set $P_{unit}^{t-1;Dn}=P_{unit}^{t-1}; P_{unit}^{t;Dn}=P_{unit}^{t}$;
24. put $\Delta P_{unit}^{Dn}$ centered around segment $[P_{unit}^{t-1;Dn};P_{unit}^{t;Dn}]$;
25. calculate unit incremental costs for t−1 and t time intervals at the end points of segment $\Delta P_{unit}^{Dn}$;
26. select smaller of $\Delta\rho_{unit}^{t-1;Dn}$ and $\Delta\rho_{unit}^{t;Dn}$ and enlarge segment $[P_{unit}^{t-1;Dn};P_{unit}^{t;Dn}]$ using that update;
27. repeat steps 25 to 27 several times (even one pass can be sufficient) until the ramping constraint is binding; and
28. update Lagrange multipliers $\rho_{unit}^{t;Dn}-\Delta\rho_{unit}^{t;Dn}$.

In the event that Lagrange dual problem is not feasible then its solution algorithms will have a tendency to increase multipliers of ramping constraints infinitely. This situation can be identified and controlled directly because ramping constraint multipliers cannot be higher then the range of unit incremental costs.

Alternative 2:

The following two examples will serve as a basis for discussing the four cases that are presented below. In a cost ($/MW) versus power output (MW) relationship, let P designates unit power output. L (L_up or L_down) is a ramping constraint: L_up is the upward constraint and L_down is the downward constraint which form upward and downward boundaries for ramping. If for example, upward ramp rate R_up is 10 MW/minute, and if the time interval T (for Dynamic Economic Dispatch) is 1 minute, then L_up=R_up*T=10 MW. Suppose that if for the time interval t, at the left boundary point of this interval, the unit power output (of a generating unit X) P_t=20 MW; at the right boundary point of this time interval, the unit power output (of the same generating unit X) P_(t+1)=40 MW, then the unit is ramping up. Note that P_(t+1)−P_t=40−20=20 MW>L_up. Therefore, the unit (X) is violating its upward ramping constraint.

Using the same example but with slight change of numbers: Let P_(t+1)=25. Then P_(t+1)−P_t=25−20=5<L_up. So the unit is not violating its upward ramping constraint. For these two cases, the Lagrange multiplier (in $/MWh or same unit of the vertical axis) for this unit and for this time interval can be adjusted to approach the optimal case in which P_(t+1)−P_t=L_up, i.e., so that the constraint is binding.

Now, considering the many possible cases more generally, let $L_{up}$ designate the upward ramping constraint, $L_{down}$ the downward ramping constraint.

In Case I, the unit is ramping up but violating the ramping constraint, so the adjustment to the Lagrange multiplier for this unit and for this time interval can be computed in such a way that the ramping violation is removed but the ramping amount equals the allowed maximum ramping amount $L_{up}$ for achieving best economics.

In Case II, the unit is ramping up without violating the ramping constraint, so the adjustment to the Lagrange multiplier for this unit and for this time interval can be computed in such a way that the ramping amount equals the allowed maximum ramping amount $L_{up}$ for achieving best economics but no more.

Figure 12:
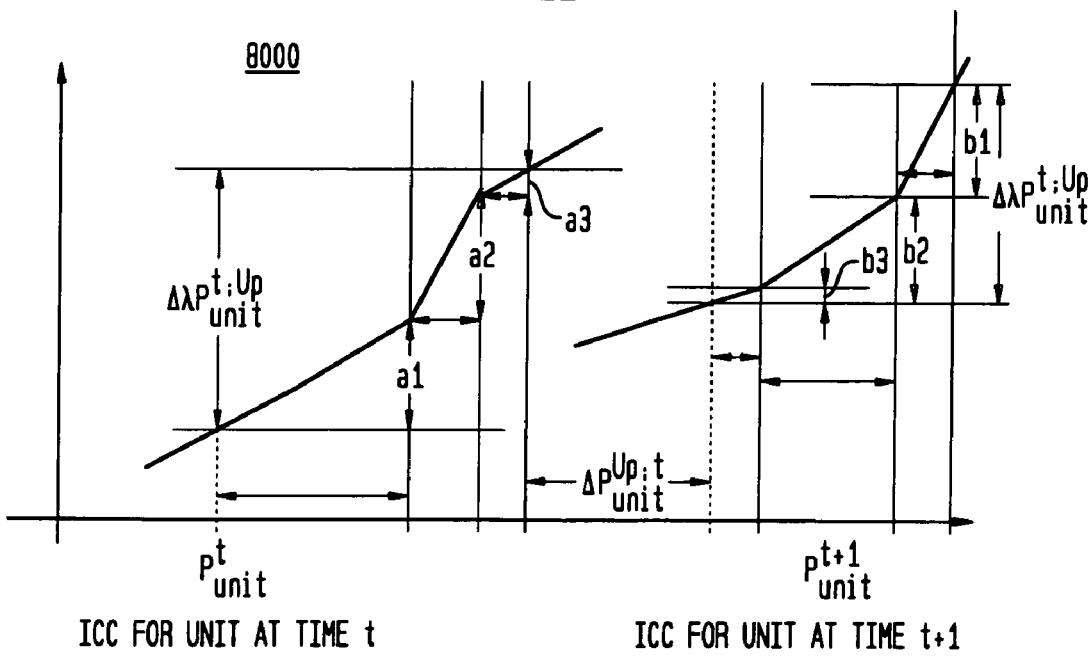
FIG. 12 is a plot of the relationship of the vertical adjustment necessary which corresponds to output power.

Case III and Case IV describe similar situations to Case I and Case II but in a downward direction. We detail the algorithms to calculate the adjustment to the Lagrange multiplier for each unit and for any time interval. Note that FIG. 12 illustrates Case I only.

For Case I (See FIG. 12): Ramping up with violation, the following notation is utilized: $x_2 = P_{unit}^{t+1;up}; x_1 = P_{unit}^{t;up}$ For ICC curve at time t, a1, a2, a3, . . . represent relevant load changes, and are replaced with $\Delta\lambda_1^1, \Delta\lambda_1^2, \ldots$ in the following equations. The slopes for the corresponding segments are denoted by $k_1^1, k_1^2, \ldots$ The total desired vertical adjustment is $\Delta\lambda_1$.

For ICC curve at time t+1, b1, b2, b3, . . . represent relevant load changes, are replaced with $\Delta\lambda_2^1, \Delta\lambda_2^2, \ldots$ in the following equations. The slopes for the corresponding segments are denoted by $k_2^1, k_2^2, \ldots$ The total desired vertical adjustment is $\Delta\lambda_2$.

For the desired adjustments: $\Delta\lambda = \Delta\lambda_1 = \Delta\lambda_2$ $$\Delta\lambda_1 = \Delta\lambda_1^1 + \ldots + \Delta\lambda_1^m \qquad (45)$$

$$\Delta\lambda_2 = \Delta\lambda_2^1 + \ldots + \Delta\lambda_2^n$$

$$\left(x_2 - \frac{\Delta\lambda_2^1}{k_2^1} - \ldots - \frac{\Delta\lambda_2^n}{k_2^n}\right) - \left(x_1 + \frac{\Delta\lambda_1^1}{k_1^1} + \frac{\Delta\lambda_1^2}{k_1^2} + \ldots + \frac{\Delta\lambda_1^m}{k_1^m}\right) = L_{up}$$

$$\left(x_2 - \frac{\Delta\lambda_2^1}{k_2^1} - \ldots - \frac{\Delta\lambda_2^{n-1}}{k_2^{n-1}} - \frac{\Delta\lambda - (\Delta\lambda_2^1 + \ldots + \Delta\lambda_2^{n-1})}{k_2^n}\right) -$$

$$\left(x_1 + \frac{\Delta\lambda_1^1}{k_1^1} + \ldots + \frac{\Delta\lambda_1^{m-1}}{k_1^{m-1}} + \frac{\Delta\lambda - (\Delta\lambda_1^1 + \ldots + \Delta\lambda_1^{m-1})}{k_1^m}\right) =$$

$$L_{up} \Rightarrow \left(\frac{1}{k_2^n} + \frac{1}{k_1^m}\right)\Delta\lambda = \left(x_2 - x_1 - L_{up} - \left(\frac{1}{k_2^n} - \frac{1}{k_2^1}\right)\Delta\lambda_2^1 - \right.$$

$$\left(\frac{1}{k_2^2} - \frac{1}{k_2^n}\right)\Delta\lambda_2^2 - \ldots - \left(\frac{1}{k_2^{n-1}} - \frac{1}{k_2^n}\right)\Delta\lambda_2^{n-1} -$$

$$\left(\frac{1}{k_1^1} - \frac{1}{k_1^m}\right)\Delta\lambda_1^1 - \ldots - \left(\frac{1}{k_1^{m-1}} - \frac{1}{k_1^m}\right)\Delta\lambda_1^{m-1}\right) \Rightarrow$$

-continued $$\Delta\lambda = \left(x_2 - x_1 - L_{up} - \left(\frac{1}{k_2^1} - \frac{1}{k_2^n}\right)\Delta\lambda_2^1 - \left(\frac{1}{k_2^2} - \frac{1}{k_2^n}\right)\Delta\lambda_2^2 - \right.$$

$$\ldots - \left(\frac{1}{k_2^{n-1}} - \frac{1}{k_2^n}\right)\Delta\lambda_2^{n-1} - \left(\frac{1}{k_1^1} - \frac{1}{k_1^m}\right)\Delta\lambda_1^1 -$$

$$\left. \ldots - \left(\frac{1}{k_1^{m-1}} - \frac{1}{k_1^m}\right)\Delta\lambda_1^{m-1}\right) / \left(\frac{1}{k_2^n} + \frac{1}{k_1^m}\right)$$

For Case II: Ramping up without violation, the following notation is utilized:

$$x_2 = P_{unit}^{t+1;up}; x_1 = P_{unit}^{t;up} \qquad (46)$$

$$\left(x_2 + \frac{\Delta\lambda_2^1}{k_2^1} + \ldots + \frac{\Delta\lambda_2^n}{k_2^n}\right) - \left(x_1 - \frac{\Delta\lambda_1^1}{k_1^1} - \frac{\Delta\lambda_1^2}{k_1^2} - \ldots - \frac{\Delta\lambda_1^m}{k_1^m}\right) = L_{up}$$

$$\left(x_2 + \frac{\Delta\lambda_2^1}{k_2^1} + \ldots + \frac{\Delta\lambda_2^{n-1}}{k_2^{n-1}} + \frac{\Delta\lambda - (\Delta\lambda_2^1 + \ldots + \Delta\lambda_2^{n-1})}{k_2^n}\right) -$$

$$\left(x_1 - \frac{\Delta\lambda_1^1}{k_1^1} - \ldots - \frac{\Delta\lambda_1^{m-1}}{k_1^{m-1}} - \frac{\Delta\lambda - (\Delta\lambda_1^1 + \ldots + \Delta\lambda_1^{m-1})}{k_1^m}\right) =$$

$$L_{up}(>0) \Rightarrow$$

$$\left(\frac{1}{k_2^n} + \frac{1}{k_1^m}\right)\Delta\lambda = \left(L_{up} - (x_2 - x_1) - \left(\frac{1}{k_2^1} - \frac{1}{k_2^n}\right)\Delta\lambda_2^1 - \ldots - \right.$$

$$\left(\frac{1}{k_2^{n-1}} - \frac{1}{k_2^n}\right)\Delta\lambda_2^{n-1} - \left(\frac{1}{k_1^1} - \frac{1}{k_1^m}\right)\Delta\lambda_1^1 -$$

$$\left. \ldots - \left(\frac{1}{k_1^{m-1}} - \frac{1}{k_1^m}\right)\Delta\lambda_1^{m-1}\right) \Rightarrow$$

$$\Delta\lambda = \left(L_{up} - (x_2 - x_1) - \left(\frac{1}{k_2^1} - \frac{1}{k_2^n}\right)\Delta\lambda_2^1 - \ldots - \right.$$

$$\left(\frac{1}{k_2^{n-1}} - \frac{1}{k_2^n}\right)\Delta\lambda_2^{n-1} - \left(\frac{1}{k_1^1} - \frac{1}{k_1^m}\right)\Delta\lambda_1^1 -$$

$$\left. \ldots - \left(\frac{1}{k_1^{m-1}} - \frac{1}{k_1^m}\right)\Delta\lambda_1^{m-1}\right) / \left(\frac{1}{k_2^n} + \frac{1}{k_1^m}\right)$$

For Case III: Ramping down without violation, the following notation is utilized:

$$x_2 = P_{unit}^{t+1;down}; x_1 = P_{unit}^{t;down} \qquad (47)$$

$$\left(x_2 + \frac{\Delta\lambda_2^1}{k_2^1} + \ldots + \frac{\Delta\lambda_2^n}{k_2^n}\right) - \left(x_1 - \frac{\Delta\lambda_1^1}{k_1^1} - \frac{\Delta\lambda_1^2}{k_1^2} + \ldots + \frac{\Delta\lambda_1^m}{k_1^m}\right) =$$

$$L_{Down}(<0)$$

$$\left(x_2 + \frac{\Delta\lambda_2^1}{k_2^1} - \ldots - \frac{\Delta\lambda_2^{n-1}}{k_2^{n-1}} + \frac{\Delta\lambda - (\Delta\lambda_2^1 + \ldots + \Delta\lambda_2^{n-1})}{k_2^n}\right) -$$

$$\left(x_1 - \frac{\Delta\lambda_1^1}{k_1^1} + \ldots + \frac{\Delta\lambda_1^{m-1}}{k_1^{m-1}} + \frac{\Delta\lambda - (\Delta\lambda_1^1 + \ldots + \Delta\lambda_1^{m-1})}{k_1^m}\right) =$$

$$L_{Down} \Rightarrow$$

$$\left(\frac{1}{k_2^n} + \frac{1}{k_1^m}\right)\Delta\lambda =$$

$$\left(x_2 - x_1 - L_{Down} - \left(\frac{1}{k_2^1} - \frac{1}{k_2^n}\right)\Delta\lambda_2^1 - \ldots - \left(\frac{1}{k_2^{n-1}} - \frac{1}{k_2^n}\right)\Delta\lambda_2^{n-1} -$$

$$\left(\frac{1}{k_1^1} - \frac{1}{k_1^m}\right)\Delta\lambda_1^1 - \ldots - \left(\frac{1}{k_1^{m-1}} - \frac{1}{k_1^m}\right)\Delta\lambda_1^{m-1}\right) \Rightarrow$$

-continued $$\Delta\lambda = \left(x_2 - x_1 - L_{Down} - \left(\frac{1}{k_2^1} - \frac{1}{k_2^n}\right)\Delta\lambda_2^1 - \ldots - \left(\frac{1}{k_2^{n-1}} - \frac{1}{k_2^n}\right)\Delta\lambda_2^{n-1} - \left(\frac{1}{k_1^1} - \frac{1}{k_1^m}\right)\Delta\lambda_1^1 - \ldots - \left(\frac{1}{k_1^{m-1}} - \frac{1}{k_1^m}\right)\Delta\lambda_1^{m-1}\right) / \left(\frac{1}{k_2^n} + \frac{1}{k_1^m}\right)$$

For Case IV: Ramping down with violation, the following notation is utilized:

$$x_2 = P_{unit}^{t+1;down}; \ x_1 = P_{unit}^{t;down} \quad (48)$$

$$\left(x_2 + \frac{\Delta\lambda_2^1}{k_2^1} + \ldots + \frac{\Delta\lambda_2^n}{k_2^n}\right) - \left(x_1 - \frac{\Delta\lambda_1^1}{k_1^1} - \frac{\Delta\lambda_1^2}{k_1^2} - \ldots - \frac{\Delta\lambda_1^m}{k_1^m}\right) =$$

$$L_{Down}(<0)$$

$$\left(x_2 + \frac{\Delta\lambda_2^1}{k_2^1} + \ldots + \frac{\Delta\lambda_2^{n-1}}{k_2^{n-1}} + \frac{\Delta\lambda - (\Delta\lambda_2^1 + \ldots + \Delta\lambda_2^{n-1})}{k_2^n} - \left(x_1 - \frac{\Delta\lambda_1^1}{k_1^1} - \ldots - \frac{\Delta\lambda_1^{m-1}}{k_1^{m-1}} - \frac{\Delta\lambda - (\Delta\lambda_1^1 + \ldots + \Delta\lambda_1^{m-1})}{k_1^m}\right)\right) =$$

$$L_{Down} \Rightarrow \left(\frac{1}{k_2^n} + \frac{1}{k_1^m}\right)\Delta\lambda =$$

$$L_{Down} - (x_2 - x_1) - \left(\frac{1}{k_2^1} - \frac{1}{k_2^n}\right)\Delta\lambda_2^1 - \ldots - \left(\frac{1}{k_2^{n-1}} - \frac{1}{k_2^n}\right)\Delta\lambda_2^{n-1} - \left(\frac{1}{k_1^1} - \frac{1}{k_1^m}\right)\Delta\lambda_1^1 - \left(\frac{1}{k_1^{m-1}} - \frac{1}{k_1^m}\right)\Delta\lambda_1^{m-1} \Rightarrow \Delta\lambda = \left(L_{Down} - (x_2 - x_1) - \left(\frac{1}{k_2^1} - \frac{1}{k_2^n}\right)\Delta\lambda_2^1 - \ldots - \left(\frac{1}{k_2^{n-1}} - \frac{1}{k_2^n}\right)\Delta\lambda_2^{n-1} - \left(\frac{1}{k_1^1} - \frac{1}{k_1^m}\right)\Delta\lambda_1^1 - \left(\frac{1}{k_1^{m-1}} - \frac{1}{k_1^m}\right)\Delta\lambda_1^{m-1}\right) / \left(\frac{1}{k_2^n} + \frac{1}{k_1^m}\right)$$

The Lagrange dual problem, $$\max_{\rho_{unit}^{t;Up}, \rho_{unit}^{t;Dn} \geq 0} L(\rho_{unit}^{t;Up}; \rho_{unit}^{t;Dn}); \ t \in T$$

is separable by time intervals $t \in T$. The Lagrangian function is concave and piecewise differentiable. The optimal values of multipliers $\rho_{unit}^{t;Up}$ and $\rho_{unit}^{t;Dn}$ must satisfy the first order condition:

$$(0,0) \in \partial L(\rho_{unit}^{t;Up}; \rho_{unit}^{t;Dn}); t \in T.$$

The sub-gradient $\partial L$ contains the violations of ramping limits at each time interval $t \in T$:

$$P_{unit}^{t} - P_{unit}^{t-1} - \Delta P_{unit}^{Up}, P_{unit}^{t} - P_{unit}^{t-1} - \Delta P_{unit}^{Dn}) \in \partial L$$
$$(\rho_{unit}^{t;Up}; \rho_{unit}^{t;Dn}); t \in T \quad (49)$$

Note that at one time interval only one ramping violation can occur.

The dual problem optimality conditions become:

$$P_{unit}^{t} - P_{unit}^{t-1} - \Delta P_{unit}^{Up} = 0 \text{ if } \rho_{unit}^{t;Up} > 0; \text{ and } P_{unit}^{t} - P_{unit}^{t-1} - \Delta P_{unit}^{Up} < 0 \text{ if } \rho_{unit}^{t;Up} = 0 \quad (50)$$

$$P_{unit}^{t} - P_{unit}^{t-1} - \Delta P_{unit}^{Dn} = 0 \text{ if } \rho_{unit}^{t;Dn} > 0; \text{ and } P_{unit}^{t} - P_{unit}^{t-1} - \Delta P_{unit}^{Dn} < 0 \text{ if } \rho_{unit}^{t;Dn} = 0 \quad (51)$$

Lagrange relaxation modifies only SCED objective functions by adding a linear unit cost term and is equivalent to adding a constant term to unit incremental cost curves.

The structure of SCED problem remains unchanged, the Dantzig-Wolfe algorithm should be adjusted as follows:

1. Calculate unit shadow ramping costs as difference of Lagrange multipliers for ramping constraints:

$$\rho_{unit}^{t;Up} - \rho_{unit}^{t+1;Up} \text{ or } \rho_{unit}^{t+1;Dn} - \rho_{unit}^{t;Dn} \text{ for } t \in T-\{t_N\}.$$

Note that for $t \in \{t_N\}$ no unit shadow ramping cost is needed.

2. Include unit shadow ramping costs into Dantzig-Wolfe master problem objective:

$$(\rho_{unit}^{t;Up} - \rho_{unit}^{t+1;Up}) \text{ or } (\rho_{unit}^{t+1;Dn} - \rho_{unit}^{t;Dn})P_{unit}^{t} \text{ for } t \in T-\{t_N\}.$$ Note that for $t \in \{t_N\}$ no unit shadow ramping cost related terms should be included in the corresponding Dantzig-Wolfe master problem objective.

3. Include unit shadow ramping costs into unit energy shadow prices as inputs into Dantzig-Wolfe sub-problems:

$$C_{unit}^{t}(P_{unit}^{t}) + (\rho_{unit}^{t;Up} - \rho_{unit}^{t+1;Up})P_{unit}^{t} \text{ or } C_{unit}^{t}$$
$$(P_{unit}^{t}) - (\rho_{unit}^{t;Dn} - \rho_{unit}^{t+1;Dn})P_{unit}^{t} \text{ for } t \in T-\{t_N\}.$$

Note that for $t \in \{t_N\}$ no unit shadow ramping cost related terms should be included in the corresponding Dantzig-Wolfe sub-problems.

If Lagrange dual problems are solved optimally, then all ramping constraints will be satisfied, i.e.:

$$P_{unit}^{t} - P_{unit}^{t-1} \leq \Delta P_{unit}^{Up}; \text{ and } P_{unit}^{t} - P_{unit}^{t-1} \leq \Delta P_{unit}^{Up}$$
for $t \in T$.

If in the same time all static SCED problems are solved optimally, then the following relations are satisfied:

$$\frac{\partial C_{unit}^{t}}{\partial P_{unit}^{t}} = -(\rho_{unit}^{t;Up} - \rho_{unit}^{t+1;Up}) + (\rho_{unit}^{t;Dn} - \rho_{unit}^{t+1;Dn}) + \lambda / pf_{unit}^{t} - \mu + \eta_{plant}^{t} + \sum SF_{line;unit}^{SE} \cdot \zeta_{unit}^{t} \quad (52)$$

for $t \in T - \{t_N\}$;

$$\frac{\partial C_{unit}^{t}}{\partial P_{unit}^{t}} = \lambda / pf_{unit}^{t} - \mu + \eta_{plant}^{t} + \sum SF_{line;unit}^{SE} \cdot \zeta_{unit}^{t} \quad (53)$$

for $t \in \{t_N\}$; and $$P_{unit}^{t} \in \mathcal{T}_{SCED}^{t}.$$

These relations present a Kuhn-Tucker optimality condition for overall Dynamic Dispatch, and therefore, if both Lagrange dual problems and static SCED problems are solved optimally for each time interval, then the overall Dynamic Dispatch is solved optimally, as well.

While the inventive method and system have been particularly shown and described with reference to several embodiments hereof, it should be understood by those skilled in the art that various changes in form and detail may be made therein without departing from the spirit and scope of the invention.

What is claimed is:

1. A method of energy management of a power system, comprising the steps of:
   monitoring the performance of the power system, detecting disturbances and calculating statistical information including frequency error;
   using historical performance data of the power system and the statistical information to generate a first corrective signal to regulate the generation of power in the power system;
   using economic factors to generate a second corrective signal to optimize economic use of power generating resources;

using the first corrective signal and second corrective signal to analyze and generate a control signal to correct the performance of the power distribution system;

dividing a time period into a plurality of sub-periods for use in predicting load demands;

using a plurality of neural networks, each of the plurality of neural networks comprising a plurality of neurons to predict a short term load demand on the power system, the sub-periods being further divided into predicting intervals and assigning one of the plurality of neural networks to each of the plurality of sub-periods;

receiving historical load data and a short term load forecast (STLF) for a STLF interval which is greater than or equal to the largest prediction interval; and using the output of each of the plurality of neural networks to predict the short term load demand in each predicting interval.

2. The method of claim 1, further comprising the step of determining the ramping constraints of each of a plurality of committed generating units.

3. The method of claim 2, further comprising the step of receiving very short term load predictions for a set of predetermined and consecutive time intervals.

4. The method of claim 3, further comprising the step of obtaining a temporal trajectory of output power for each of the plurality of generating units over the set of predetermined and consecutive time intervals, such that costs associated with changing power output within the power system is minimized.

5. The method of claim 4, further comprising the step of assigning a respective temporal trajectory of output power to each of the plurality of generating units.

6. The method of claim 5, further comprising the step of allocating the use of power generating resources based on the control signal generated to correct the performance of the power system.

7. The method of claim 6, further comprising the step of categorizing a type of performance error and assigning a priority level to the type of performance error.

8. The method of claim 7, further comprising the step of executing corrective action based on the priority level assigned to the type of performance error.

9. A method of energy management of a power system, comprising the steps of:

monitoring the performance of the power system, detecting disturbances and calculating statistical information including frequency error;

using historical performance data of the power system and the statistical information to generate a first corrective signal to regulate the generation of power in the power system;

using economic factors to generate a second corrective signal to optimize economic use of power generating resources; and using the first corrective signal and second corrective signal to analyze and generate a control signal to correct the performance of the power system; and determining the ramping constraints of each of a plurality of committed generating units; and obtaining a temporal trajectory of output power for each of the plurality of generating units over a set of predetermined and consecutive time intervals, such that costs associated with changing power output within the electrical power system is minimized.

10. The method of claim 9 further comprising the step of receiving very short term load predictions for the set of predetermined and consecutive time intervals.

11. The method of claim 10, further comprising the step of assigning a respective temporal trajectory of output power to each of the plurality of generating units.

12. A computer-readable medium having stored thereon instructions which when executed by a processor, cause the processor to perform the steps of:

detecting disturbances and calculating statistical information including frequency error;

using historical performance data of the power system and the statistical information to generate a first corrective signal to regulate the generation of power in the power system;

using economic factors to generate a second corrective signal to optimize economic use of power generating resources; and using the first corrective signal and second corrective signal to analyze and generate a control signal to correct the performance of the power system;

determining the ramping constraints of each of a plurality of committed generating units; and obtaining a temporal trajectory of output power for each of the plurality of generating units over a set of predetermined and consecutive time intervals, such that costs associated with changing power output within the electrical power system is minimized.

13. A system for managing a power system, comprising a monitoring module for monitoring the performance of the power system, for detecting disturbances and for calculating statistical information including frequency error;

a control module in communication with the monitoring module for processing the statistical information generated by the monitoring module and for generating a first corrective signal to regulate the generation of power in the power system;

a control decision module in communication with the control module for analyzing and generating a control signal to correct the performance of the power system;

an economic dispatch module in communication with the control decision module for using economic factors to generate a second corrective signal to optimize economic use of power generating resources, wherein the control decision module uses both the first corrective signal and the second corrective signal to analyze and determine a corrective course of action, represented by the control signal generated by the control decision module; and a processor for dividing a time period into a plurality of sub-periods and prediction intervals, the processor receiving and processing historical load data and a short term load forecast (STLF) for a STLF interval which is greater than or equal to the largest prediction interval and wherein the first corrective signal and second corrective signal are used to analyze and generate a control signal to correct the performance of the power system.

14. The system of claim 13, further comprising a plurality of neural networks, each of the plurality of neural networks comprising a plurality of neurons to predict a short term load demand on the power system, the sub-periods being further divided into predicting intervals and assigning one of the plurality of neural networks to each of the plurality of sub-periods.

15. The system of claim 14, wherein the output of each of the plurality of neural networks is used to predict the short term load demand in each predicting interval.

16. The system of claim 15, wherein the processor is operative for determining the ramping constraints of each of a plurality of committed generating units and receiving very short term load predictions for a set of predetermined and consecutive time intervals.

17. The system of claim 16, wherein the processor obtains a temporal trajectory of output power for each of the plurality of generating units over the set of predetermined and consecutive time intervals, such that costs associated with changing power output within the electrical power system is minimized.

18. The system of claim 17, wherein the processor assigns a respective temporal trajectory of output power to each of the plurality of generating units.

19. The system of method of claim 18, wherein the processor calculates statistical information comprising calculated real-time statistical data and statistical data based on historical data.

20. The system of claim 19, wherein the processor is operative for determining the available power generating resources and the time need to correct the disturbance and using the determined available power generating resources and time needed to correct the disturbance to generate the first corrective signal.

21. The system of claim 19, wherein the processor is operative for ignoring the generation of the first corrective signal in the event that either the available power generating resources or the time available to correct the disturbance within a predetermined time period is insufficient to take corrective action.

* * * * *